(12) United States Patent
Chen et al.

(10) Patent No.: US 12,323,900 B2
(45) Date of Patent: Jun. 3, 2025

(54) CELL RESELECTION METHOD, TERMINAL DEVICE, AND NETWORK DEVICE

(71) Applicant: Huawei Technologies Co., Ltd., Shenzhen (CN)

(72) Inventors: Lei Chen, Beijing (CN); Bingzhao Li, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 335 days.

(21) Appl. No.: 17/848,781

(22) Filed: Jun. 24, 2022

(65) Prior Publication Data
US 2022/0330133 A1 Oct. 13, 2022

Related U.S. Application Data

(63) Continuation of application No. PCT/CN2019/128250, filed on Dec. 25, 2019.

(51) Int. Cl.
*H04W 48/02* (2009.01)
*H04W 36/00* (2009.01)
*H04W 48/16* (2009.01)

(52) U.S. Cl.
CPC ....... *H04W 48/02* (2013.01); *H04W 36/0061* (2013.01); *H04W 48/16* (2013.01)

(58) Field of Classification Search
CPC . H04W 36/0061; H04W 48/02; H04W 48/16; H04W 48/20; Y02D 30/07
See application file for complete search history.

(56) References Cited

U.S. PATENT DOCUMENTS

| | | | | |
|---|---|---|---|---|
| 2017/0026891 A1* | 1/2017 | Hahn | ............ | H04W 36/008375 |
| 2019/0110244 A1* | 4/2019 | Shih | ...................... | H04W 76/27 |
| 2019/0174395 A1* | 6/2019 | Choe | ...................... | H04W 72/56 |
| 2020/0374076 A1* | 11/2020 | Wang | ..................... | H04L 5/0053 |
| 2021/0144626 A1* | 5/2021 | Han | ...................... | H04L 1/1614 |

FOREIGN PATENT DOCUMENTS

| | | |
|---|---|---|
| CN | 101237701 A | 8/2008 |
| CN | 101489285 A | 7/2009 |
| CN | 105519188 A | 4/2016 |
| CN | 108882321 A | 11/2018 |
| CN | 109996332 A | 7/2019 |
| CN | 110351791 A | 10/2019 |
| WO | 2018203709 A1 | 11/2018 |
| WO | 2019033433 A1 | 2/2019 |
| WO | 2019068257 A1 | 4/2019 |
| WO | 2019157708 A1 | 8/2019 |

\* cited by examiner

*Primary Examiner* — Nader Bolourchi
(74) *Attorney, Agent, or Firm* — Slater Matsil, LLP

(57) ABSTRACT

This application provides a cell reselection method, a terminal device, and a network device. The terminal device may be a low-bandwidth terminal device, so that a time period for the terminal device to perform cell reselection is reduced, and power consumption of the terminal device is reduced. The method includes: The terminal device receives first indication information sent by the network device, where the first indication information indicates information about an initial bandwidth part of a first cell, the first cell is a neighboring cell of a second cell, and the second cell is a cell on which the terminal device currently camps. The terminal device determines, based on a type of the terminal device and the first indication information, whether to reselect to the first cell.

20 Claims, 6 Drawing Sheets

CELL RESELECTION METHOD, TERMINAL DEVICE, AND NETWORK DEVICE

CROSS-REFERENCE TO RELATED APPLICATIONS

This application is a continuation of International Application No. PCT/CN2019/128250, filed on Dec. 25, 2019, the disclosure of which is hereby incorporated by reference in its entirety.

TECHNICAL FIELD

This application relates to the communication field, and specifically, to a cell reselection method, a terminal device, and a network device.

BACKGROUND

In a current 5G new radio access technology (NR) system, to ensure that a terminal device can achieve a high service rate and a low latency, the terminal device needs to have strong capabilities, for example, a multi-antenna capability and a high bandwidth capability. However, in an actual scenario, some terminal devices, such as machine type communication (MTC) devices, are not sensitive to a service rate and a latency. Instead, costs of the terminal devices need to be limited, in other words, the terminal devices are not provided with a strong multi-antenna capability and a high bandwidth capability.

When performing cell search or cell reselection, because a bandwidth of a searched or reselected cell is not suitable, terminal devices that do not support a high bandwidth capability usually keep performing cell search or cell reselection until a suitable cell is found for camping. As a result, this increases a time period for these terminal devices to perform cell search and cell reselection, and also increases power consumption of the terminal devices.

SUMMARY

This application provides a cell reselection method, a terminal device, and a network device, to prevent the terminal device from reselecting to a cell whose bandwidth is not supported by the terminal device that does not support a bandwidth of the terminal device.

According to a first aspect, a cell reselection method is provided. The method includes: A terminal device receives first indication information sent by a network device, where the first indication information indicates information about an initial bandwidth part of a first cell, the first cell is a neighboring cell of a second cell, and the second cell is a cell on which the terminal device currently camps. The terminal device determines, based on a type of the terminal device and the first indication information, whether to reselect to the first cell.

In the foregoing technical solution, the terminal device can obtain the information about the initial bandwidth part of the first cell based on the first indication information sent by the network device, and the terminal device determines, depending on whether the information about the initial bandwidth part of the first cell matches the type of the terminal device, whether to reselect to the first cell. This prevents the terminal device from reselecting to a cell that does not support a bandwidth of the terminal device.

Specifically, when reselecting to the first cell for cell camping, if the terminal device determines, only based on signal quality of the first cell, whether to reselect to the first cell, the terminal device may fail to camp on the first cell because the terminal device does not support an initial bandwidth part of a target cell. However, the terminal device in the foregoing technical solution of this application can determine, before reselecting to the first cell, whether a bandwidth of the first cell supports the type of the terminal device, to prevent the terminal device from reselecting to an unsuitable cell. This reduces a time period for the terminal device to perform cell reselection, and also reduces power consumption of the terminal device.

With reference to the first aspect, in some implementations of the first aspect, that the terminal device determines, based on a type of the terminal device and the first indication information, whether to reselect to the first cell includes: When the terminal device detects that the first cell meets a reselection measurement criterion, if the type of the terminal device does not support the initial bandwidth part of the first cell, the terminal device skips measuring the first cell, or if the type of the terminal device supports the initial bandwidth part of the first cell, the terminal device measures the first cell.

In the foregoing technical solution, cell reselection is a process in which the terminal device selects a more suitable cell. If there are some cells with a higher priority or a better signal in neighboring cells of a cell on which the terminal device currently camps, a protocol-agreed cell reselection measurement criterion is used to determine a cell that is in the neighboring cells and that needs to be measured. When the first cell meets the reselection measurement criterion and measurement needs to be performed on the first cell, the terminal device determines, based on the initial bandwidth part of the first cell, whether to measure the first cell, to prevent the terminal device from measuring a cell whose bandwidth is not supported, thereby further reducing the power consumption of the terminal device.

With reference to the first aspect, in some implementations of the first aspect, that the terminal device determines, based on the first indication information, whether to reselect to the first cell includes: When the terminal device determines that the first cell is a target cell, if the type of the terminal device does not support the initial bandwidth part of the first cell, the terminal device skips reselecting to the first cell, or if the type of the terminal device supports the initial bandwidth part of the first cell, the terminal device reselects from the second cell to the first cell.

In the foregoing technical solution, the first cell is the target cell of the terminal device, and the target cell is a cell that is most suitable for the terminal device to camp on and that is in all the neighboring cells that meet the cell reselection measurement criterion, for example, a cell with a highest signal strength. The terminal device determines, based on the initial bandwidth part of the first cell, whether to reselect to the first cell, to prevent the terminal device from reselecting to the cell whose bandwidth is not supported, thereby reducing the power consumption of the terminal device.

With reference to the first aspect, in some implementations of the first aspect, the type of the terminal device is a first-type terminal device or a second-type terminal device, and a bandwidth capability of the first-type terminal device is different from a bandwidth capability of the second-type terminal device. For example, the first terminal device may be a legacy (legacy) NR terminal device, and the second terminal device may be a lightweight NR terminal device. The lightweight NR terminal device may also be referred to as an NR-light terminal device, and a bandwidth of the NR terminal device is greater than a bandwidth of the lightweight NR terminal device.

In the foregoing technical solution, the bandwidth capability of the first-type terminal device is different from the bandwidth capability of the second-type terminal device. The first-type terminal device or the second-type terminal device may determine, depending on whether the bandwidth capability of the first-type terminal device or the bandwidth capability of the second-type terminal device matches the information about the initial bandwidth part of the first cell, whether to measure the first cell or reselect to the first cell.

With reference to the first aspect, in some implementations of the first aspect, the information about the initial bandwidth part of the first cell includes one or more of the following information: a bandwidth width of the initial bandwidth part of the first cell and a type of the initial bandwidth part of the first cell.

In the foregoing technical solution, the first-type terminal device or the second-type terminal device may determine, depending on whether a device type of the first-type terminal device or a device type of the second-type terminal device matches the bandwidth width of the initial bandwidth part and/or the type of the initial bandwidth part of the first cell, whether to measure the first cell or reselect to the first cell.

With reference to the first aspect, in some implementations of the first aspect, the type of the initial bandwidth part of the first cell includes: an initial bandwidth part that supports camping of the first-type terminal device, an initial bandwidth part that supports camping of the second-type terminal device, and an initial bandwidth part that supports camping of both the first-type terminal device and the second-type terminal device.

In the foregoing technical solution, the first-type terminal device or the second-type terminal device may determine, depending on whether the device type of the first-type terminal device or the device type of the second-type terminal device matches the type of the initial bandwidth part of the first cell, whether to measure the first cell or reselect to the first cell. According to a second aspect, a cell reselection method is provided. The method includes: A network device sends first indication information to a terminal device, where the first indication information indicates information about an initial bandwidth part of a first cell, the first cell is a neighboring cell of a second cell, and the second cell is a cell on which the terminal device currently camps.

According to a second aspect, a cell reselection method is provided. The method includes: A network device sends first indication information to a terminal device, where the first indication information indicates information about an initial bandwidth part of a first cell, the first cell is a neighboring cell of a second cell, and the second cell is a cell on which the terminal device currently camps.

With reference to the second aspect, in some implementations of the second aspect, the information about the initial bandwidth part of the first cell includes one or more of the following information: a bandwidth width of the initial bandwidth part of the first cell and a type of the initial bandwidth part of the first cell.

With reference to the second aspect, in some implementations of the second aspect, the type of the initial bandwidth part of the first cell includes: an initial bandwidth part that supports camping of a first-type terminal device, an initial bandwidth part that supports camping of a second-type terminal device, and an initial bandwidth part that supports camping of both the first-type terminal device and the second-type terminal device, where a bandwidth capability of the first-type terminal device is different from a bandwidth capability of the second-type terminal device.

For technical effects brought by the second aspect or the possible implementations of the second aspect, refer to the descriptions of the technical effects of the first aspect or the implementations of the first aspect. Details are not described again.

According to a third aspect, an initial cell access method is provided. The method includes: A terminal device receives a first synchronization signal block from a network device, where the first synchronization signal block includes first indication information, the first indication information indicates a cell type of a first cell, the first cell is a cell defined by a second synchronization signal block, the first synchronization signal block includes second indication information, the second indication information indicates a location of the second synchronization signal block, the first synchronization signal block is a non-cell-defined synchronization signal block, and the second synchronization signal block is a cell-defined synchronization signal block. The terminal device determines, based on a type of the terminal device and the cell type of the first cell, whether to search for the second synchronization signal block at the location of the second synchronization signal block.

In the foregoing technical solution, the second synchronization signal block defines the first cell. The terminal device can obtain the cell type of the first cell and the location of the second synchronization signal block respectively based on the first indication information and the second indication information that are sent by the network device. The terminal device determines, depending on whether the type of the terminal device matches the cell type of the first cell, whether to search for the second synchronization signal block at the location of the second synchronization signal block, to prevent the terminal device from searching for a cell that does not match the type of the terminal device.

Specifically, in a conventional technology, the terminal device searches for a cell at a location of a second synchronization signal block upon finding that the second synchronization signal defines the cell. When performing camping, the terminal device may fail to camp on the cell because a cell type of the cell does not match the terminal device. In the foregoing technical solution, before searching for the second synchronization signal, the terminal device can quickly determine, based on the cell type indicated in the first indication information, whether the cell defined by the second synchronization signal block is suitable for camping, and then determine whether to search for the second synchronization signal. This reduces a time period for the terminal device to search for a suitable cell to camp on, and also reduces power consumption of the terminal device.

With reference to the third aspect, in some implementations of the third aspect, the type of the terminal device is a first-type terminal device or a second-type terminal device, and a bandwidth capability of the first-type terminal device is different from a bandwidth capability of the second-type terminal device. For example, the first terminal device is an NR terminal device, and the second terminal device is a lightweight NR terminal device. The lightweight NR terminal device may also be referred to as an NR-light terminal device, and a bandwidth of the NR terminal device is greater than a bandwidth of the lightweight NR terminal device.

In the foregoing technical solution, the bandwidth capability of the first-type terminal device is different from the bandwidth capability of the second-type terminal device, and the second synchronization signal block defines the first cell. The first-type terminal device or the second-type terminal device can determine, depending on whether the bandwidth capability of the first-type terminal device or the bandwidth capability of the second-type terminal device matches the cell type of the first cell, whether to search for the second synchronization signal block at the location of the second synchronization signal block, to quickly find a cell suitable for the terminal device to camp on, thereby reducing the power consumption of the terminal device.

With reference to the third aspect, in some implementations of the third aspect, the cell type includes: a cell that supports camping of the first-type terminal device, a cell that supports camping of the second-type terminal device, and a cell that supports camping of both the first-type terminal device and the second-type terminal device.

In the foregoing technical solution, different types of cells support camping of different types of terminal devices, and the second synchronization signal block defines the first cell. The first-type terminal device or the second-type terminal device determines, depending on whether the type of the terminal device matches the cell type of the first cell, whether to search for the second synchronization signal block at the location of the second synchronization signal block, to quickly find a cell suitable for the terminal device to camp on, thereby reducing the power consumption of the terminal device.

With reference to the third aspect, in some implementations of the third aspect, before that a terminal device receives a first synchronization signal block, the method further includes: The terminal device searches for a synchronization signal block in frequency domain based on a preset step, where the synchronization signal block is the first synchronization signal block.

According to a fourth aspect, an initial cell access method is provided. The method includes: A network device sends a first synchronization signal block to a terminal device, where the first synchronization signal block includes first indication information, the first indication information indicates a cell type of a first cell, the first cell is a cell defined by a second synchronization signal block the first synchronization signal block includes second indication information, the second indication information indicates a location of the second synchronization signal block, the first synchronization signal block is a non-cell-defined synchronization signal block, and the second synchronization signal block is a cell-defined synchronization signal block.

With reference to the fourth aspect, in some implementations of the fourth aspect, the cell type includes: a cell that supports camping of a first-type terminal device, a cell that supports camping of a second-type terminal device, and a cell that supports camping of both the first-type terminal device and the second-type terminal device, where a bandwidth capability of the first-type terminal device is different from a bandwidth capability of the second-type terminal device.

For technical effects brought by the fourth aspect or the implementations of the fourth aspect, refer to the descriptions of the technical effects of the third aspect or the implementations of the third aspect. Details are not described again.

According to a fifth aspect, an initial cell access method is provided. The method includes: A terminal device receives third indication information, where the third indication information includes a first barring parameter and a second barring parameter, the first barring parameter is used by a first-type terminal device to perform initial access to a first cell, the second barring parameter is used by a second-type terminal device to perform initial access to the first cell, and a bandwidth capability of the first-type terminal device is different from a bandwidth capability of the second-type terminal device. The terminal device determines, based on a type of the terminal device, to use the first barring parameter or the second barring parameter.

In the foregoing technical solution, two sets of cell barring parameters are configured. The terminal device can flexibly select a corresponding first cell barring parameter from the two sets of cell barring parameters based on the type of the terminal device, and then determine, based on the corresponding cell barring parameter, whether to access the first cell or another cell that has a same frequency as the first cell.

According to a sixth aspect, an initial cell access method is provided. The method includes: A network device sends third indication information, where the third indication information includes a first barring parameter and a second barring parameter, the first barring parameter is used by a first-type terminal device to perform initial access to a first cell, the second barring parameter is used by a second-type terminal device to perform initial access to the first cell, and a bandwidth capability of the first-type terminal device is different from a bandwidth capability of the second-type terminal device.

For a technical effect brought by the sixth aspect, refer to the descriptions of the technical effect of the fifth aspect. Details are not described again.

According to a seventh aspect, a terminal device is provided. The terminal device includes a transceiver unit and a processing unit. The transceiver unit is configured to receive first indication information sent by a network device, where the first indication information indicates information about an initial bandwidth part of a first cell, the first cell is a neighboring cell of a second cell, and the second cell is a cell on which the terminal device currently camps. The processing unit is configured to determine, based on a type of the terminal device and the first indication information, whether to reselect to the first cell.

With reference to the seventh aspect, in some implementations of the seventh aspect, the processing unit is specifically configured to: when detecting that the first cell meets a reselection measurement criterion, if the type of the terminal device does not support the initial bandwidth part of the first cell, skip measuring the first cell, or if the type of the terminal device supports the initial bandwidth part of the first cell, measure the first cell.

With reference to the seventh aspect, in some implementations of the seventh aspect, the processing unit is specifically configured to: when determining that the first cell is a target cell, if the type of the terminal device does not support the initial bandwidth part of the first cell, control the terminal device not to reselect to the first cell, or if the type of the terminal device supports the initial bandwidth part of the first cell, control the terminal device to reselect from the second cell to the first cell.

With reference to the seventh aspect, in some implementations of the seventh aspect, the type of the terminal device is a first-type terminal device or a second-type terminal device, and a bandwidth capability of the first-type terminal device is different from a bandwidth capability of the second-type terminal device.

With reference to the seventh aspect, in some implementations of the seventh aspect, the information about the initial bandwidth part of the first cell includes one or more of the following information: a bandwidth width of the initial bandwidth part of the first cell and a type of the initial bandwidth part of the first cell.

With reference to the seventh aspect, in some implementations of the seventh aspect, the type of the initial bandwidth part of the first cell includes: an initial bandwidth part that supports camping of the first-type terminal device, an initial bandwidth part that supports camping of the second-type terminal device, and an initial bandwidth part that supports camping of both the first-type terminal device and the second-type terminal device.

According to an eighth aspect, a network device is provided. The network device includes a transceiver unit. The transceiver unit is configured to send first indication information to a terminal device, where the first indication information indicates information about an initial bandwidth part of a first cell, the first cell is a neighboring cell of a second cell, and the second cell is a cell on which the terminal device currently camps.

With reference to the eighth aspect, in some implementations of the eighth aspect, the information about the initial bandwidth part of the first cell includes one or more of the following information: a bandwidth width of the initial bandwidth part of the first cell and a type of the initial bandwidth part of the first cell.

With reference to the eighth aspect, in some implementations of the eighth aspect, the type of the initial bandwidth part of the first cell includes: an initial bandwidth part that supports camping of a first-type terminal device, an initial bandwidth part that supports camping of a second-type terminal device, and an initial bandwidth part that supports camping of both the first-type terminal device and the second-type terminal device, where a bandwidth capability of the first-type terminal device is different from a bandwidth capability of the second-type terminal device.

According to a ninth aspect, a terminal device is provided. The terminal device includes a transceiver unit and a processing unit. The transceiver unit is configured to receive a first synchronization signal block from a network device, where the first synchronization signal block includes first indication information, the first indication information indicates a cell type of a first cell, the first cell is a cell defined by a second synchronization signal block, the first synchronization signal block includes second indication information, the second indication information indicates a location of the second synchronization signal block, the first synchronization signal block is a non-cell-defined synchronization signal block, and the second synchronization signal block is a cell-defined synchronization signal block. The processing unit is configured to determine, based on a type of the terminal device and the cell type of the first cell, whether to search for the second synchronization signal block at the location of the second synchronization signal block.

With reference to the ninth aspect, in some implementations of the ninth aspect, the type of the terminal device is a first-type terminal device or a second-type terminal device, and a bandwidth capability of the first-type terminal device is different from a bandwidth capability of the second-type terminal device.

With reference to the ninth aspect, in some implementations of the ninth aspect, the cell type includes: a cell that supports camping of the first-type terminal device, a cell that supports camping of the second-type terminal device, and a cell that supports camping of both the first-type terminal device and the second-type terminal device.

With reference to the ninth aspect, in some implementations of the ninth aspect, the processing unit searches for a synchronization signal block in frequency domain based on a preset step, where the synchronization signal block is the first synchronization signal block.

According to a tenth aspect, a network device is provided. The network device includes a transceiver unit. The transceiver unit is configured to send a first synchronization signal block to a terminal device, where the first synchronization signal block includes first indication information, the first indication information indicates a cell type of a first cell, the first cell is a cell defined by a second synchronization signal block, the first synchronization signal block includes second indication information, the second indication information indicates a location of the second synchronization signal block, the first synchronization signal block is a non-cell-defined synchronization signal block, and the second synchronization signal block is a cell-defined synchronization signal block.

With reference to the tenth aspect, in some implementations of the tenth aspect, the cell type includes: a cell that supports camping of a first-type terminal device, a cell that supports camping of a second-type terminal device, and a cell that supports camping of both the first-type terminal device and the second-type terminal device, where a bandwidth capability of the first-type terminal device is different from a bandwidth capability of the second-type terminal device.

According to an eleventh aspect, a terminal device is provided. The terminal device includes a transceiver unit and a processing unit. The transceiver unit is configured to receive third indication information sent by a network device, where the third indication information includes a first barring parameter and a second barring parameter, the first barring parameter is used by a first-type terminal device to perform initial access to a first cell, the second barring parameter is used by a second-type terminal device to perform initial access to the first cell, and a bandwidth capability of the first-type terminal device is different from a bandwidth capability of the second-type terminal device. The processing unit is configured to determine, based on a type of the terminal device, to use the first barring parameter or the second barring parameter.

According to a twelfth aspect, a network device is provided. The network device includes a transceiver unit. The transceiver unit is configured to send third indication information to a terminal device, where the third indication information includes a first barring parameter and a second barring parameter, the first barring parameter is used by a first-type terminal device to perform initial access to a first cell, the second barring parameter is used by a second-type terminal device to perform initial access to the first cell, and a bandwidth capability of the first-type terminal device is different from a bandwidth capability of the second-type terminal device.

For technical effects brought by the seventh aspect to the twelfth aspect or the implementations of the seventh aspect to the twelfth aspect, refer to the descriptions of the technical effects on a method side of the first aspect to the sixth aspect or the implementations of the first aspect to the sixth aspect. Details are not described herein again.

According to a thirteenth aspect, a communication apparatus is provided. The communication apparatus includes a processor. The processor is coupled to a memory, and may be configured to execute instructions in the memory, to implement the method according to any one of the first aspect, the third aspect, or the fifth aspect and the possible implementations of the first aspect, the third aspect, or the fifth aspect. Optionally, the communication apparatus further includes the memory. Optionally, the communication apparatus further includes a communication interface, and the processor is coupled to the communication interface.

In an implementation, the communication apparatus is a terminal device. When the communication apparatus is the terminal device, the communication interface may be a transceiver or an input/output interface.

In another implementation, the communication apparatus is a chip disposed in a terminal device. When the communication apparatus is the chip disposed in the terminal device, the communication interface may be an input/output interface.

Optionally, the transceiver may be a transceiver circuit. Optionally, the input/output interface may be an input/output circuit.

According to a fourteenth aspect, a communication apparatus is provided. The communication apparatus includes a processor. The processor is coupled to a memory, and may be configured to execute instructions in the memory, to implement the method according to any one of the second aspect, the fourth aspect, or the sixth aspect and the possible implementations of the second aspect, the fourth aspect, or the sixth aspect. Optionally, the communication apparatus further includes the memory. Optionally, the communication apparatus further includes a communication interface, and the processor is coupled to the communication interface.

In an implementation, the communication apparatus is a network device. When the communication apparatus is the network device, the communication interface may be a transceiver or an input/output interface.

In another implementation, the communication apparatus is a chip disposed in a network device. When the communication apparatus is the chip disposed in the network device, the communication interface may be an input/output interface.

Optionally, the transceiver may be a transceiver circuit. Optionally, the input/output interface may be an input/output circuit.

According to a fifteenth aspect, a processor is provided. The processor includes an input circuit, an output circuit, and a processing circuit. The processing circuit is configured to receive a signal through the input circuit, and transmit a signal through the output circuit, so that the processor performs the method according to any one of the first aspect to the sixth aspect or the possible implementations of the first aspect to the sixth aspect.

In a specific implementation process, the processor may be one or more chips, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in embodiments of this application.

According to a sixteenth aspect, a processing apparatus is provided. The processing apparatus includes a processor and a memory. The processor is configured to read instructions stored in the memory, and may receive a signal via a receiver, and transmit a signal via a transmitter, to perform the method according to any one of the first aspect to the sixth aspect or the possible implementations of the first aspect to the sixth aspect.

Optionally, there are one or more processors and one or more memories.

Optionally, the memory may be integrated into the processor, or the memory and the processor may be separately disposed.

In a specific implementation process, the memory may be a non-transitory memory, for example, a read-only memory (ROM). The memory and the processor may be integrated on a same chip, or may be separately disposed on different chips. A type of the memory and a manner of disposing the memory and the processor are not limited in embodiments of this application.

It should be understood that, a related data exchange process such as sending of indication information may be a process of outputting the indication information from the processor, and receiving of capability information may be a process of receiving the input capability information by the processor. Specifically, data output by the processor may be output to the transmitter, and input data received by the processor may be from the receiver. The transmitter and the receiver may be collectively referred to as a transceiver.

The processing apparatus according to the sixteenth aspect may be one or more chips. The processor in the processing apparatus may be implemented by hardware, or may be implemented by software. When the processor is implemented by hardware, the processor may be a logic circuit, an integrated circuit, or the like. When the processor is implemented by software, the processor may be a general-purpose processor, and is implemented by reading software code stored in the memory. The memory may be integrated into the processor, or may be located outside the processor and exist independently.

According to a seventeenth aspect, a computer program product is provided. The computer program product includes a computer program (which may also be referred to as code or instructions). When the computer program is run, a computer is enabled to perform the method according to any one of the first aspect to the sixth aspect and the possible implementations of the first aspect to the sixth aspect.

According to an eighteenth aspect, a computer-readable storage medium is provided. The computer-readable storage medium stores a computer program (which may also be referred to as code or instructions). When the computer program is run on a computer, the computer is enabled to perform the method according to any one of the first aspect to the sixth aspect and the possible implementations of the first aspect to the sixth aspect.

According to a nineteenth aspect, a communication system is provided. The communication system includes the terminal device in the seventh aspect, the ninth aspect, the eleventh aspect, or the thirteenth aspect and the network device in the eighth aspect, the tenth aspect, the twelfth aspect, or the fourteenth aspect.

DETAILED DESCRIPTION OF ILLUSTRATIVE EMBODIMENTS

The following describes the technical solutions of this application with reference to the accompanying drawings.

The technical solutions in embodiments of this application may be applied to various communication systems, for example, a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a future 5th generation (5G) system or a new radio (NR) system, a vehicle-to-everything (V2X) system, a long term evolution-vehicle (LTE-V) system, an Internet of vehicles system, a machine type communication (MTC) system, an internet of things (IoT) system, a long term evolution-machine (LTE-M) system, a machine-to-machine (M2M) system, and the like, where V2X may include vehicle to network (V2N), vehicle to vehicle (V2V), vehicle to infrastructure (V2I), vehicle to pedestrian (V2P), and the like.

The technical solutions provided in this application may be further applied to a future communication system, for example, a sixth generation mobile communication system. This is not limited in this application.

Figure 1:
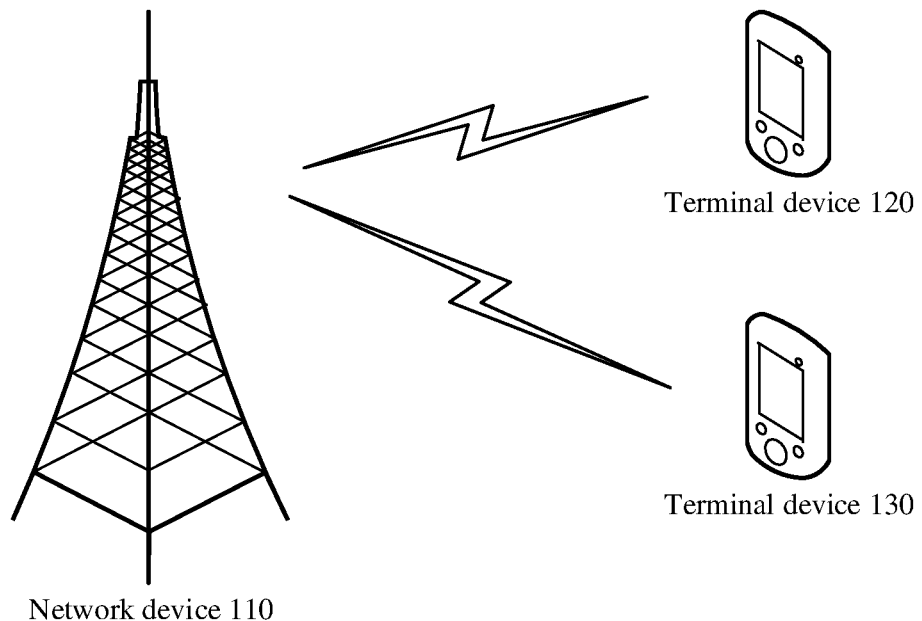
FIG. 1 is a schematic diagram of a network architecture according to an embodiment of this application.

FIG. 1 is a schematic diagram of a network architecture according to an embodiment of this application. As shown in FIG. 1, a communication system in embodiments of this application may include a network device and a plurality of terminal devices. The network device may include one or more antennas. In addition, the network device may additionally include a transmitter chain and a receiver chain. A person of ordinary skill in the art may understand that the transmitter chain and the receiver chain each may include a plurality of components (such as a processor, a modulator, a multiplexer, a demodulator, a demultiplexer, or an antenna) related to signal sending and receiving.

The network device may communicate with the plurality of terminal devices. A terminal device in embodiments of this application may also be referred to as user equipment (UE), a mobile station (MS), a mobile terminal (MT), an access terminal, a subscriber unit, a subscriber station, a mobile station, a remote station, a remote terminal, a mobile device, a user terminal, a terminal, a wireless communication device, a user agent, a user apparatus, or the like.

The terminal device may be a device that provides voice/data connectivity for a user, for example, a handheld device or a vehicle-mounted device that has a wireless connection function. Currently, examples of some terminal devices are a mobile phone, a tablet computer, a laptop computer, a palmtop computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, a vehicle-mounted device, a wearable device, a terminal device in a 5G network, a terminal device in a future evolved public land mobile network (PLMN), and/or any other suitable device configured to perform communication in a wireless communication system. This is not limited in embodiments of this application.

The wearable device may also be referred to as a wearable intelligent device, and is an umbrella term for wearable devices such as glasses, gloves, watches, clothes, and shoes that are developed by applying wearable technologies to intelligent designs of daily wear. The wearable device is a portable device that is directly worn on a body or integrated into user's clothes or accessories. The wearable device is not merely a hardware device. The wearable device can implement powerful functions through software support, data exchange, and cloud interaction. In a broad sense, wearable intelligent devices include full-featured and large-sized devices that can implement complete or partial functions without depending on smartphones, such as smart watches or smart glasses, and devices that focus on only one type of application function and need to work with other devices such as smartphones, such as various smart bands or smart jewelry for monitoring physical signs.

In addition, the terminal device in embodiments of this application may alternatively be a terminal device in an internet of things system. IoT is an important part of future development of information technologies. A main technical feature of the IoT is connecting things to networks using a communication technology, to implement an intelligent network for interconnection between persons and machines or between things.

In addition, in embodiments of this application, the terminal device may further include a sensor such as an intelligent printer, a train detector, or a gas station. Main functions of the terminal device include collecting data (for some terminal devices), receiving control information and downlink data from a network device, sending an electromagnetic wave, and sending uplink data to the network device.

A network device in embodiments of this application may be a device configured to communicate with a terminal device. The network device may be an evolved NodeB (evolved NodeB, eNB or eNodeB) in an LTE system, or may be a radio controller in a cloud radio access network (CRAN) scenario, or may be a radio network controller (RNC), a base station controller (BSC), a home base station (for example, a home evolved NodeB, a home NodeB, or an HNB), a baseband unit (BBU), or the network device may be a relay station, an access point, a vehicle-mounted device, a wearable device, a network device in a future 5G network, a network device in a future evolved PLMN network, or the like, may be an access point (AP) in a wireless local area network (WLAN), a wireless relay node, a wireless backhaul node, a transmission point (TP), a transmission reception point (TRP), or the like, or may be a gNB or a transmission point (TRP or TP) in a new radio (NR) system, or one or a group of (including a plurality of antenna panels) antenna panels of a base station in a 5G system, or may be a network node that constitutes a gNB or a transmission point, for example, a baseband unit (BBU) or a distributed unit (DU). This is not limited in embodiments of this application.

In some deployment, the gNB may include a centralized unit (CU) and the DU. The gNB may further include an active antenna unit (AAU for short). The CU implements some functions of the gNB, and the DU implements some other functions of the gNB. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be classified into a network device in an access network (RAN), or the CU may be classified into a network device in a core network (CN). This is not limited in this application.

In addition, in embodiments of this application, the network device provides a cell with a service, and the terminal device communicates with the cell by using a transmission resource (for example, a frequency domain resource or a spectrum resource) allocated by the network device. The cell may belong to a macro base station (for example, a macro eNB or a macro gNB), or may belong to a base station corresponding to a small cell. The small cell herein may include a metro cell, a micro cell, a pico cell, a femto cell, and the like. The small cells are characterized by small coverage and a low transmit power, and are applicable to providing a high-rate data transmission service.

In addition, in embodiments of this application, the network device may include a base station (gNB), for example, a macro base station, a micro base station, an indoor hotspot, or a relay node, and has functions of: sending a radio wave to the terminal device, to implement downlink data transmission and control uplink transmission by sending scheduling information, and receiving a radio wave sent by the terminal device, to receive uplink data transmission.

To better understand embodiments of this application, the following first describes concepts in embodiments of this application.

1. Synchronization signal block (SSB): A synchronization signal block includes a primary/secondary synchronization signal and a physical broadcast channel (PBCH), and provides downlink synchronization of a cell and basic configuration information of the cell for UE. The PBCH carries a master information block (MIB) of the cell. The MIB indicates whether there is a system information block type 1 (SIB1) and indicate a location of the SIB1. The SSB occupies four symbols in time domain and 20 physical resource blocks (PRBs) in frequency domain. SSBs may be classified into a cell-defined SSB and a non-cell-defined SSB. The cell-defined SSB indicates that the SSB defines a cell, where specifically, a MIB indicates that there is an SIB1. The non-cell-defined SSB indicates that the SSB does not define a cell, where a MIB in the non-cell-defined SSB indicates that there is no SIB1, and a bit originally used to indicate a location of the SIB1 may be used to indicate a location of a next cell-defined SSB. The SSB appears regularly in frequency domain, that is, the SSB may appear at a specific interval. After the UE is powered on, the UE may search for a cell at the interval. If the UE finds that an SSB is the cell-defined SSB, the UE may consider that there is a cell on which the UE can camp.

2. Bandwidth part (BWP): At a 5th generation radio access system standard NR physical layer, a downlink frequency domain resource is measured in resource blocks (RBs). With an increase of mobile subscribers and emergence of large-capacity services (for example, high-definition video services), supporting a high bandwidth is an important aspect for mobile communication evolving to a future 5G system, NR system, or the like. A greater bandwidth indicates more bandwidth resources for data transmission and a greater service volume that can be supported. In a high-carrier-bandwidth communication system, a bandwidth supported by UE may be less than a carrier bandwidth in consideration of costs of the UE and a service volume of the UE. A greater bandwidth supported by the UE indicates a stronger processing capability of the UE, a higher data transmission rate of the UE, and higher design costs of the UE. For example, in a 5G system, a maximum carrier bandwidth may be 400 megahertzes (MHz), and a radio frequency bandwidth capability of the UE may be 20 MHz, 50 MHz, 100 MHz, or the like. In a wireless communication system, radio frequency bandwidth capabilities of different UE may be the same or different.

In the high-carrier-bandwidth communication system, because the radio frequency bandwidth capability of the UE is less than the carrier bandwidth, a concept of a bandwidth part is proposed, to be specific, one BWP includes several consecutive RBs in frequency domain. A terminal device performs transmission on a BWP of the terminal device. The BWP may be a group of consecutive frequency domain resources on a carrier. Frequency domain resources that can be occupied by different BWPs may partially overlap or may not overlap. A part of a spectrum is allocated to the UE for use on a broadband, to adjust to a bandwidth that can be supported by the UE. In addition, BWPs of a plurality of different bandwidths are configured for the UE, so that flexible scheduling of the UE and UE energy saving are implemented.

Initial BWP: A bandwidth of an SIB1 is indicated by a MIB that is broadcast in a cell-defined SSB, and the bandwidth of an SIB1 is defined as an initial BWP. UE can obtain the SIB1 and other system information (OSI) on the initial BWP, and can monitor paging. In a current protocol, a bandwidth of an initial BWP may be set to 5 MHz, 10 MHz, or 20 MHz.

Active BWP: When a service reaches UE, a base station schedules the service from an initial BWP to a BWP whose bandwidth matches the service, and the BWP is referred to as an active BWP. According to a current standard, Type 0A and Type 2 physical downlink control channel (PDCCH)

common search spaces (CSSs) are configured on the active BWP. In other words, the UE can receive paging and OSI on the current active BWP.

3. Parameters included in a MIB:
SystemFrameNumber, which occupies 6 bits, and indicates high-order 6 bits of a frame number of a current frame;
SubCarrierSpacingCommon, which occupies 1 bit, and indicates a subcarrier spacing of an initial BWP;
Ssb-SubcarrierOffset, which occupies 3 bits. When the parameter is a special value, it indicates that the MIB has no corresponding SIB1, that is, an SSB is non-cell-defined;
Dmrs-TypeA-Position, which occupies 1 bit, and indicates a type of a demodulation reference signal (DMRS);
pdcch-ConfigSIB1, which occupies 8 bits, and indicates a location of an SIB1 (initial BWP), where if an SSB is non-cell-defined, a location of a CD-SSB may be indicated;
cellBarred, which occupies 1 bit, and indicates whether a current cell is barred (barred); and
intraFreqReselection, which occupies 1 bit, and indicates whether UE is allowed to reselect to another cell on a current frequency if a current cell is barred.

4. Cell barring: Cell barring is a manner of controlling load by a network, and the network may control UE not to camp on a cell in the case of heavy load. There are two cell barring parameters: cellBarred and intraFreqReselection. After reading a MIB of a cell, if the UE finds, based on cellBarred, that the cell is barred, the UE cannot camp on the current cell. If intraFreqReselection is set to NotAllowed, it indicates that the UE cannot reselect to another cell on this frequency. If intraFreqReselection is set to Allowed, it indicates that the UE can reselect to another cell on the frequency.

5. Cell reservation: Cell reservation is a means for a network to control use of a cell. When the network sets a current cell as a cell reserved for another purpose, UE cannot camp on the current cell even if the UE is not barred to camp on the current cell based on the parameter cellBarred of the current cell.

Figure 2:
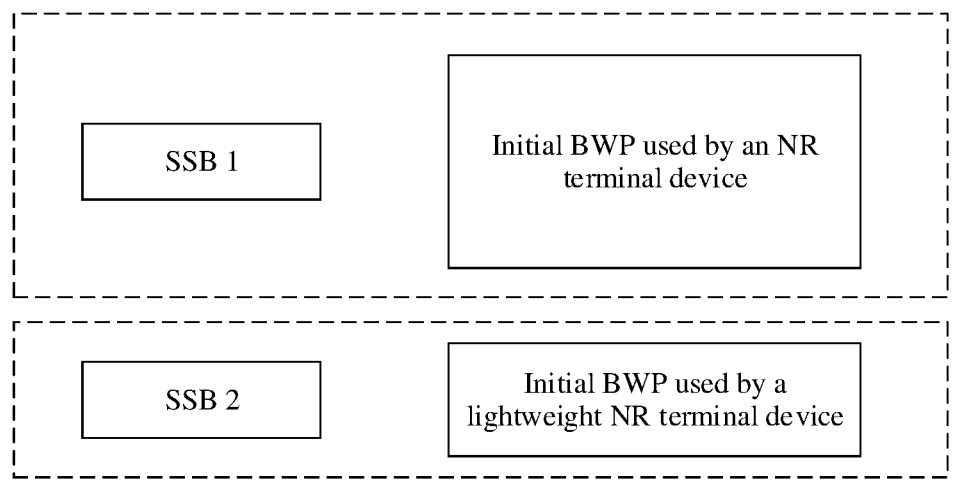
FIG. 2 is a schematic diagram of a possible deployment manner of a synchronization signal block and an initial bandwidth part in a lightweight NR system to which an embodiment of this application is applied.
Figure 3:
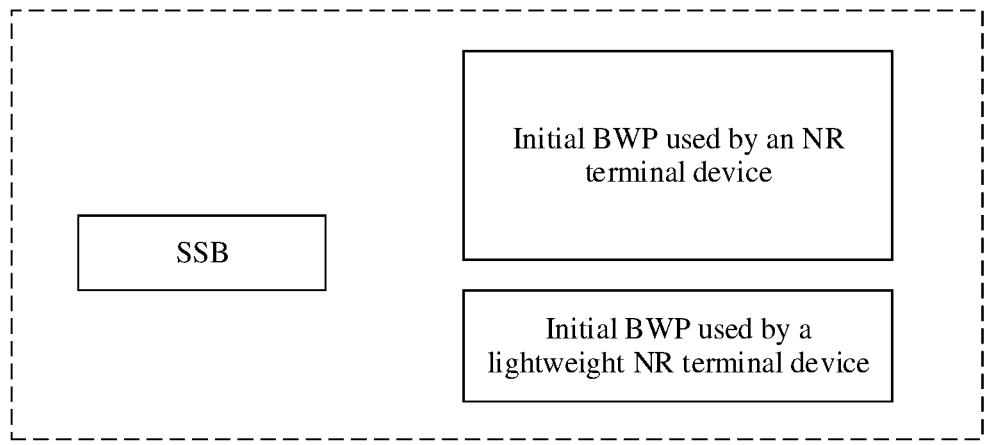
FIG. 3 is a schematic diagram of another possible deployment manner of a synchronization signal block and an initial bandwidth part in a lightweight NR system to which an embodiment of this application is applied.

FIG. 2 and FIG. 3 each are a schematic diagram of a possible deployment manner of a synchronization signal block SSB and an initial bandwidth part initial BWP in a lightweight NR system to which an embodiment of this application is applied.

The lightweight NR system is an NR system designed for a terminal device with a low hardware capability. The lightweight NR system can ensure that the terminal device with the low hardware capability can work normally. Alternatively, the lightweight NR system may be implemented by enabling an existing NR system to serve the terminal device with the low hardware capability. In other words, the lightweight NR system may be independent of the existing NR system, or may be a system obtained by enhancing the existing NR system.

A lightweight NR cell is a cell that provides a service for the terminal device with the low hardware capability.

In a scenario shown in FIG. 2, one cell-defined SSB is mapped to only one initial BWP, and either a common NR cell or the lightweight NR cell is defined. The common NR cell may also be referred to as a legacy NR cell or an NR cell, and the lightweight NR cell may also be referred to as an NR-light cell. A name of a cell type is not limited in this application. A difference between the NR cell and the NR-light cell lies in a related configuration. Generally, an initial BWP of the NR-light cell has a narrower bandwidth than that of an initial BWP of the NR cell.

Because the bandwidth of the initial BWP of the NR-light cell is narrower, a terminal device that can camp only on the NR-light cell may be referred to as a lightweight NR terminal device or an NR-light terminal device. Because the bandwidth of the initial BWP of the NR cell is wider, a terminal device that can camp on the NR cell is referred to as a legacy NR terminal device or an NR terminal device. A bandwidth of the NR terminal device is greater than a bandwidth of the NR-light terminal device. The name of the foregoing terminal device is merely an example, and is not limited in this application.

It should be understood that, because the bandwidth of the NR terminal device is greater than the bandwidth of the NR-light terminal device, the legacy NR terminal device may camp on the NR-light cell as well as the NR cell.

In the scenario shown in FIG. 2, an SSB 1 is mapped to an initial BWP that can be used by the NR terminal device, that is, the SSB 1 defines an NR cell. An SSB 2 is mapped to an initial BWP that can be used by the NR-light terminal device, that is, the SSB 2 defines an NR-light cell.

In a scenario shown in FIG. 3, an SSB is mapped to two initial BWPs. One initial BWP is an initial BWP that can be used by an NR terminal device, and the other initial BWP is an initial BWP that can be used by an NR-light terminal device, that is, the SSB defines a cell that supports both the NR terminal device and the NR-light terminal device, that is, the cell can support two types of terminal devices.

In an existing cell search process, a terminal device searches for a cell-defined SSB in frequency domain based on a specific step. If an SSB is a non-cell-defined SSB, only a location of a next cell-defined SSB is indicated in a MIB of the SSB, and whether a cell defined by the next cell-defined SSB is suitable for the terminal device to camp on is not indicated. This may increase a time period for the terminal device to search for a suitable cell, and also increase power consumption.

In view of this, in embodiments of this application, a cell search mechanism of a terminal device is optimized, so that an NR-light terminal device effectively finds a suitable cell for camping. This reduces a time period for searching, and also reduces power consumption of the terminal device.

The following describes in detail embodiments provided in this application with reference to the accompanying drawings.

Figure 4:
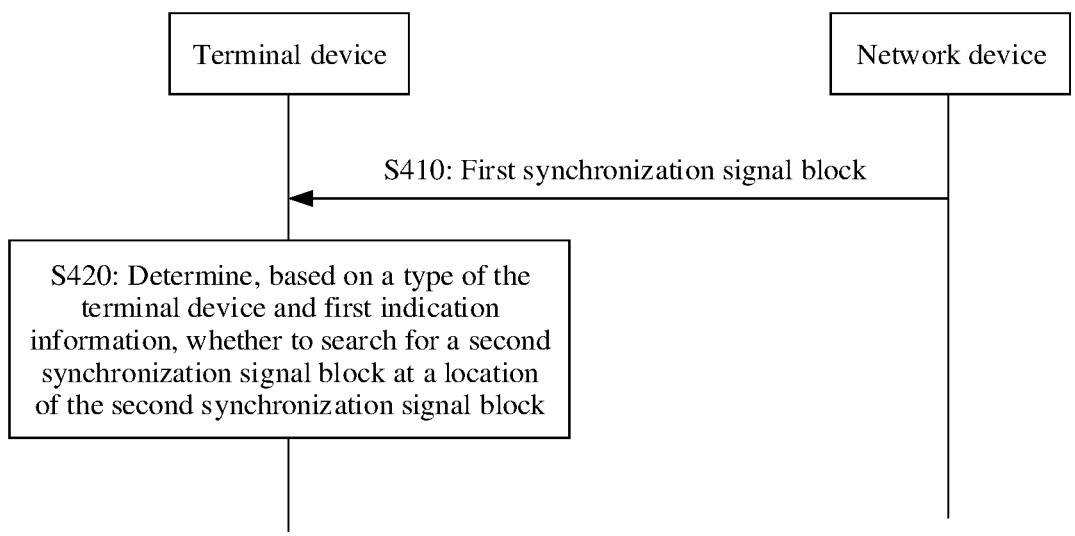
FIG. 4 is a schematic interaction diagram of an initial cell access method according to an embodiment of this application.

FIG. 4 is a schematic interaction diagram of an initial cell access method according to an embodiment of this application. A terminal device in FIG. 4 may be the terminal device 120 or 130 in FIG. 1, and a network device may be the network device no in FIG. 1.

S410: The terminal device receives a first SSB sent by the network device.

Correspondingly, the network device has sent the first SSB to the terminal device at a location of the first SSB.

Optionally, the first SSB is an SSB that is obtained by the terminal device through searching in frequency domain based on a preset step after the terminal device is powered on.

The first SSB may be a non-cell-defined SSB, and the first SSB includes first indication information and second indication information. The second indication information indicates a location of a next cell-defined SSB following the first synchronization signal block, namely, a location of a second synchronization signal block. The first indication information indicates a cell type of a first cell defined by the second synchronization signal block.

Optionally, the terminal device may obtain the first indication information and the second indication information from a PBCH of the first SSB. In a possible implementation, the terminal device may obtain the first indication information and the second indication information from a MIB on the PBCH of the first SSB.

Optionally, the cell type of the first cell includes: a cell that supports camping of a first-type terminal device, a cell that supports camping of a second-type terminal device, or a cell that supports camping of both the first-type terminal device and the second-type terminal device. For example, the following provides descriptions by using an example in which the cell that supports camping of the first-type terminal device includes a legacy NR cell, the cell that supports camping of the second-type terminal device includes an NR-light cell, and the cell that supports camping of both the first-type terminal device and the second-type terminal device includes a cell featuring both the NR cell and the NR-light cell, and vice versa.

The first-type terminal device and the second-type terminal device have different hardware capabilities, which may be specifically different bandwidths that are supported, different quantities of antennas, different maximum modulation orders that are supported, different maximum subcarrier spacings that are supported, different signal processing capabilities, and the like. A case in which the hardware capability of the first-type terminal device is greater than the capability of the second terminal device is used below for description, and vice versa. For example, the first-type terminal device includes a legacy NR terminal device, and the second-type terminal device includes an NR-light terminal device, where a bandwidth of the legacy NR terminal device is greater than a bandwidth of the NR-light terminal device.

Optionally, because the first synchronization signal block (non-cell-defined SSB) does not define any cell, the first indication information may indicate, by re-defining two bits of cell barring parameters (namely, two bits of cellBarred and intraFreqReselection) in the first synchronization signal block or one bit of SubCarrierSpacingCommon, a cell type of a cell defined by the second synchronization signal block (cell-defined SSB). Specifically, any one or more of the foregoing three bits may be used to indicate the cell type of the cell defined by the cell-defined SSB. A specific method for re-interpreting the three bits is not limited in this application.

S420: The terminal device determines, based on a type of the terminal device and the first indication information, whether to search for the second synchronization signal block at the location of the second synchronization signal block.

If the terminal device is the second-type terminal device, for example, the NR-light terminal device, and the first cell is the cell that supports camping of the second-type terminal device, for example, the NR-light cell, it indicates that the type of the terminal device matches the type of the first cell, that is, the terminal device can camp on the first cell. In this case, the terminal device searches for the second synchronization signal block at the location of the second synchronization signal block. If the first cell is the cell that supports camping of the first-type terminal device, for example, the NR cell, the terminal device continues to search for a next SSB based on the previously preset step.

If the terminal device is the first-type terminal device, for example, the legacy NR terminal device, and the first cell is the cell that supports camping of the first-type terminal device, for example, the NR cell, it indicates that the type of the terminal device matches the type of the first cell, that is, the terminal device can camp on the first cell. In this case, the terminal device searches for the second synchronization signal block at the location of the second synchronization signal block. If the first cell is the cell that supports camping of the second-type terminal device, for example, the NR-light cell, the terminal device continues to search for a next SSB based on the previously protocol-agreed step.

Optionally, because the first-type terminal device (for example, the legacy NR terminal device) can also camp on the cell (for example, the NR-light cell) that supports camping of the second-type terminal device, the legacy NR terminal device may also directly search for the second synchronization information block at the location of the second synchronization signal block, regardless of whether a cell defined by the second synchronization information block is an NR cell.

In the foregoing technical solution, the type of the cell defined by the next cell-defined SSB is indicated by the non-cell-defined SSB, so that the NR-light terminal device can quickly determine whether the cell is suitable for camping. This reduces a time period for searching for the NR-light cell, and reduces power consumption of the terminal device.

After successfully camping on a cell, the terminal device in an idle state continuously monitors signal quality of a neighboring cell and the current cell, to perform cell reselection, so that the terminal device selects an optimal cell that provides a service signal for the terminal device.

For ease of understanding, cell selection/reselection is briefly described first.

1. Cell Selection

When a terminal device is powered on or a radio link failure occurs, the terminal device performs a cell search process and selects a suitable cell to camp on as soon as possible. This process is referred to as "cell selection".

An example of a possible cell selection process is as follows.

In the cell search process, the terminal device reads system information of a cell, and obtains parameters such as Qrxlevmeas, Qrxlevmin, and Qrxlevminoffset. The terminal device evaluates, according to a criterion S, whether the cell is a suitable cell. Once the suitable cell is found, that is, the cell meets the criterion S, the cell selection process is completed. If the cell is not a suitable cell, the terminal device continues to search until the terminal device finds the suitable cell and camps on the cell.

A formula of the criterion S is Srxlev>0. To be specific, if an S value of a cell is greater than 0, it indicates that the cell is a suitable cell, namely, a cell suitable for camping. Srxlev is calculated according to the following formula:

$$Srxlev = Qrxlevmeas - (Qrxlevmin - Qrxlevminoffset) - Pcompensation.$$

Srxlev is a cell selection receive level value obtained through calculation.

Qrxlevmeas is a received signal strength value measured by the terminal device, and the value is a measured reference signal received power (reference signal received power, RSRP).

Qrxlevmin is a minimum received signal strength value required by the cell.

Pcompensation is a larger value of (PEMAX−PUMAX) or 0, where PEMAX is a maximum allowed transmit power set by a system when the terminal device accesses the cell, and PUMAX is a maximum output power specified based on a level of the terminal device.

Qrxlevminoffset is valid only when the terminal device camping normally in a virtual private mobile network (virtual private mobile network, VPMN) periodically searches for a high-priority public land mobile network (public land mobile network, PLMN) for cell selection evaluation, and this parameter is an offset of Qrxlevmin.

It should be noted that the formula of the criterion S and the formula for calculating Srxlev may change due to some reasons as communication protocol versions evolve. The formulas provided herein are only examples, and these examples do not impose any limitation on the formulas. A parameter and a criterion for cell selection are not limited in embodiments of this application.

2. Cell Reselection Measurement Criterion

After the terminal device camps on a cell, with movement of the terminal device, the terminal device may need to move to another cell having a higher priority or better signal strength for camping. This is a cell reselection process. Cell selection is a process of finding a suitable cell as soon as possible, while cell reselection is a process of selecting a more suitable cell. To save power of the terminal device, the cell reselection measurement criterion is specified in a protocol.

The terminal device keeps measuring a frequency layer or system whose priority is higher than that of a camped cell.

In the camped cell, if Srxlev≤Sintrasearch, the terminal device starts measurement on an intra-frequency cell/equal-priority cell, where Sintrasearch is an intra-frequency measurement start threshold.

In the camped cell, if Srxlev≤Snonintrasearch or Snonintrasearch is not configured, the terminal device starts measuring a low-priority frequency and a low-priority system, where Snonintrasearch is an inter-frequency/inter-system measurement start threshold.

3. Cell Reselection Criterion

After the measurement, the terminal device determines whether to perform cell reselection to a new cell, where reselection criteria are as follows.

Reselection criterion for a high-priority frequency or a high-priority system: A time period in which the terminal device camps on an original cell exceeds 1 second, and for a specific time period, Srxlev in a target frequency cell>Threshx-high, where Threshx-high is a threshold for reselecting to the high-priority frequency from a current serving carrier.

Reselection criterion for a low-priority frequency or a low-priority system: A time period in which the terminal device camps on an original cell exceeds 1 second, and no cell having a high-priority (or equal-priority) frequency meets the reselection requirement, and for a specific time, Srxlev in the camped cell<Threshserving-low, where Threshx-low is a threshold for reselecting to the low-priority frequency from a current serving carrier.

Reselection criterion for an equal-priority frequency or an equal-priority system: A time period in which the terminal device camps on an original cell exceeds 1 second, and no cell having a high-priority frequency meets the reselection condition, and cell reselection to a cell having the equal-priority frequency is performed according to a ranking (Ranking) criterion for intra-frequency cell reselection. The following defines the ranking criterion for intra-frequency cell reselection, where Rs is a ranking value of a current camped cell, and Rn is a ranking value of a neighboring cell:

$$Rs = Qmeas\_s + Qhyst - Qoffset\_temp, \text{ and}$$
$$Rn = Qmeas\_s - Qoffset - Qoffset\_temp.$$

Qhyst is a hysteresis value, used to prevent ping-pong reselection.

Qmeas_s is a received signal strength value of the camped cell, and is obtained by the terminal device through measurement.

Qoffset: For intra-frequency, when Qoffsets_n is valid, a value of Qoffset is Qoffsets_n; 好的, the value of Qoffset is 0. For inter-frequency, when Qoffsets_n is valid, the value of Qoffset is Qoffsets_n+Qoffsetfrequency; or when Qoffsets_n is invalid, the value of Qoffset is Qoffsetfrequency.

Qoffset_temp is an offset. For example, the offset may be an offset that is added for a cell after the terminal device fails to establish an RRC connection to the cell and that is broadcast by a network.

The terminal device sorts ranking values of all cells that meet the cell selection criterion S. During reselection, the terminal device does not simply reselect to a cell that has a best ranking, but finds a highest ranking value during sorting. Cells whose ranking values differ from the highest ranking value within a specific range (for example, x dB, where x is configurable) are considered as similar (similar) cells, and a cell with the highest ranking value is also referred to as a target cell.

Generally, configuration parameters required by the current camped cell and the neighboring cell are broadcast in a system message of the current camped cell, so that the terminal device can calculate the parameters such as Rs and Rn. Qmeas is a received signal strength value of a cell, and is obtained by the terminal device through measurement. A maximum of N beams of each cell whose signal strength is higher than a threshold may be used to generate cell quality, and the cell quality that is layer 3 filtered is used as Qmeas. The threshold and N are notified to the terminal device in a broadcast message, where N is an integer greater than or equal to 1. A beam whose signal strength is higher than the threshold is considered as a good beam.

It should be noted that the formulas for calculating Rs and Rn may change due to some reasons as communication protocol versions evolve. The formulas provided herein are only examples, and these examples do not impose any limitation on the formulas. A parameter and a criterion for cell reselection are not limited in embodiments of this application.

As described above, according to the foregoing cell reselection mechanism, when a target cell is determined only based on signal quality of a cell without considering that an NR-light terminal device may not have a high bandwidth capability, the terminal device may consequently not support a bandwidth of an initial BWP of the target cell, and cannot reselect to the target cell. This may cause a waste of resources and increase power consumption of the terminal device.

In view of this, in embodiments of this application, an NR-light cell reselection mechanism is optimized, so that the NR-light terminal device is prevented from performing measurement on or reselecting to a cell whose bandwidth is not supported. This reduces signaling overheads and reduces power consumption of the terminal device.

Figure 5:
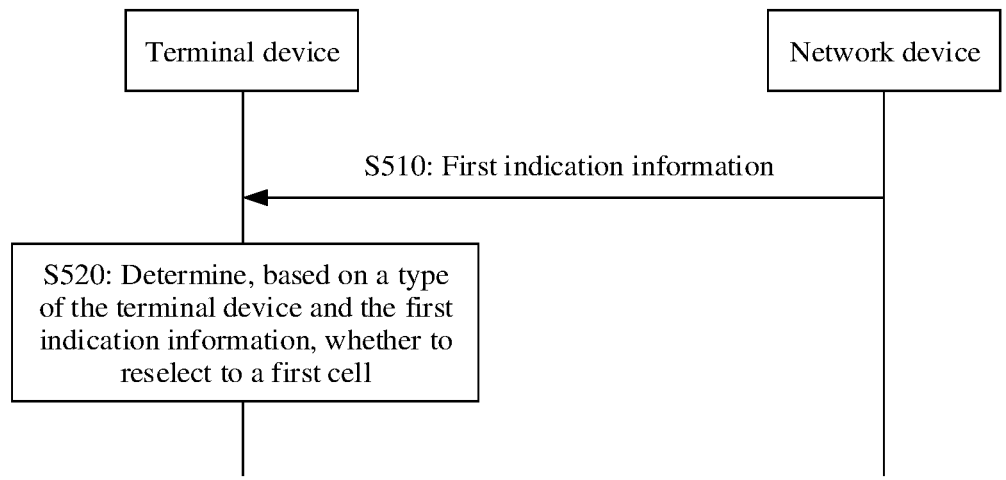
FIG. 5 is a schematic interaction diagram of a cell reselection method according to an embodiment of this application.

FIG. 5 is a schematic interaction diagram of a cell reselection method according to an embodiment of this application. A terminal device in FIG. 5 may be the terminal device 120 or 130 in FIG. 1, and a network device may be the network device no in FIG. 1.

S510: The terminal device receives first indication information sent by the network device.

Correspondingly, the network device has sent the first indication information to the terminal device.

After camping on a second cell, the terminal device keeps receiving second cell reselection-related system information that is sent by the network device, where the system information includes first indication information, the first indication information indicates information about a bandwidth of an initial BWP of a first cell, and the first cell is a neighboring cell of the second cell. For example, the information about the bandwidth of the initial BWP of the first cell includes a bandwidth width of the initial BWP of the first cell and/or a bandwidth type of the initial BWP of the first cell.

By way of example but not limitation, the first indication information includes a parameter Per frequency/cell, where Per frequency/cell indicates the information about the bandwidth of the initial BWP of the first cell.

Optionally, the first indication information indicates the bandwidth width of the initial BWP of the first cell, where the bandwidth width of the initial BWP is a width of a CORESET #0 in a MIB, and a configuration of the CORESET #0 is indicated by a parameter pdcch-ConfigSIB1 in the MIB.

Optionally, if all neighboring cells of the second cell support bandwidth widths of a plurality of initial BWPs, the second cell reselection-related system information may further indicate bandwidth widths of a plurality of other initial BWP, in addition to including the bandwidth width of the initial BWP of the first cell. To reduce system information overheads, a bandwidth width of a common initial BWP may be broadcast, and then a bandwidth width of a cell that is different from a common bandwidth is broadcast.

Optionally, the first indication information may be used to indicate the bandwidth type of the initial BWP of the first cell. For example, the bandwidth type of the initial BWP includes a bandwidth that is of an initial BWP and that supports camping of a first-type terminal device, a bandwidth that is of an initial BWP and that supports camping of a second-type terminal device, and a bandwidth that is of an initial BWP and that supports camping of both the first-type terminal device and the second-type terminal device. For example, the bandwidth that is of the initial BWP and that supports camping of the first-type terminal device includes a bandwidth of an initial BWP of a legacy NR cell, the bandwidth that is of the initial BWP and that supports camping of the second-type terminal device includes a bandwidth of an initial BWP of an NR-light cell, and the bandwidth that is of the initial BWP and that supports camping of both the first-type terminal device and the second-type terminal device includes bandwidths of initial BWPs of both the NR cell and the NR-light cell.

The first-type terminal device and the second-type terminal device may be terminal devices having different hardware capabilities, which may be specifically different bandwidths that are supported, different quantities of antennas, different maximum modulation orders that are supported, different maximum subcarrier spacings that are supported, different signal processing capabilities, and so on. An example in which the hardware capability of the first-type terminal device is greater than the capability of the second terminal device is used for description, and vice versa. For example, the first-type terminal device includes a legacy NR terminal device, and the second-type terminal device includes an NR-light terminal device, where a bandwidth of the NR terminal device is greater than a bandwidth of the NR-light terminal device.

Optionally, if all the neighboring cells of the second cell support bandwidth types of a plurality of initial BWPs, the second cell reselection-related system information may further separately indicate a plurality of other bandwidth types, in addition to including the bandwidth type of the initial BWP of the first cell. To reduce the system information overheads, only the type of the bandwidth that is of the initial BWP and that supports camping of the second-type terminal device may be indicated. For example, only the bandwidth of the initial BWP of the NR-light cell is indicated.

Optionally, the first indication information may be used to indicate a bandwidth that is of an initial BWP and that is re-indicated in an SIB1 of the first cell.

Optionally, the first indication information may further include a carrier width configuration of the first cell and frequency band information of the first cell. For example, the carrier width configuration may include carrier start locations and bandwidths that are of the first cell in different subcarrier spacings.

S520: The terminal device determines, based on a type of the terminal device and the first indication information, whether to reselect to the first cell.

As described above, before performing cell reselection, the terminal device first determines, based on a cell reselection measurement criterion, to-be-measured cells in the neighboring cells of the second cell Optionally, if the first cell meets the reselection measurement criterion, the terminal device determines, based on the type of the terminal device and bandwidth information that is of the initial BWP of the first cell and that is indicated in the first indication information, whether to measure the first cell.

If the type of the terminal device supports the bandwidth of the initial BWP of the first cell, the terminal device measures the first cell; or if the type of the terminal device does not support the bandwidth of the initial BWP of the first cell, the terminal device skips measuring the first cell. In this way, the first cell does not finally become a target cell for cell reselection.

It should be understood that, when the first indication information includes the carrier width configuration of the first cell and/or the frequency band information of the first cell, the terminal device further needs to determine whether the terminal device supports a carrier width of the first cell and/or the frequency band information of the first cell. The terminal device measures the first cell only when the terminal device supports all information about the first cell in the first indication information. When the terminal device does not supports all information about the first cell in the first indication information, the terminal device skips measuring the first cell.

As described above, before the terminal device performs cell reselection, the terminal device determines, based on an existing cell reselection criterion, the target cell to which the terminal device is reselected.

Optionally, if the first cell is the target cell of the terminal device, the terminal device determines, based on the type of the terminal device and the bandwidth information that is of the initial BWP of the first cell and that is indicated in the first indication information, whether a bandwidth of an initial BWP of the target cell is supported.

If the type of the terminal device supports the bandwidth of the initial BWP of the first cell, the terminal device reselects to the first cell; or if the type of the terminal device does not support the bandwidth of the initial BWP of the first cell, the terminal device skips measuring the first cell.

It should be understood that, when the first indication information includes the carrier width configuration of the first cell and/or the frequency band information of the first cell, the terminal device further needs to determine whether the terminal device supports the carrier width of the first cell and/or the frequency band information of the first cell. The terminal device reselects to the first cell only when the terminal device supports all the information about the first cell in the first indication information. When the terminal device does not supports all information about the first cell in the first indication information, the terminal device skips reselecting to the first cell.

In the foregoing solution, the first indication information carries bandwidth information of an initial BWP of the neighboring cell, so that the NR-light terminal device is prevented from measuring a cell or reselecting to a cell whose bandwidth is not supported by the NR-light terminal device, to reduce power consumption of the terminal device.

As described above, the MIB includes a cell barring parameter. However, currently, the MIB includes only one set of cell barring parameters and is applicable only to the scenario shown in FIG. 2. In the scenario shown in FIG. 3, a cell defined by a cell-defined SSB supports both the NR cell and the NR-light cell, but the current cell barring parameter cannot indicate access barring functions of the two cells.

In view of this, this application provides a method, so that cell barring parameters can be more flexibly configured in the scenario shown in FIG. 3.

Figure 6:
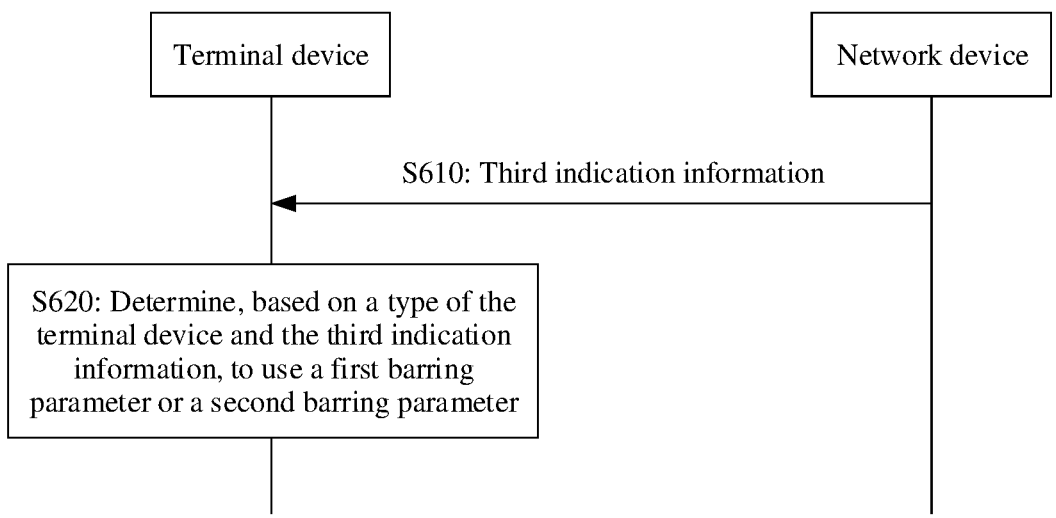
FIG. 6 is a schematic interaction diagram of another initial cell access method according to an embodiment of this application.

FIG. 6 is a schematic interaction diagram of another initial cell access method according to an embodiment of this application.

S610: A terminal device receives third indication information sent by a network device. The terminal device in FIG. 6 may be the terminal device 120 or 130 in FIG. 1, and the network device may be the network device no in FIG. 1.

Correspondingly, the network device has sent the third indication information to the terminal device.

Optionally, the terminal device may obtain the third indication information from a MIB that is of a first cell and that is sent by the network device.

The third indication information includes a first barring parameter and a second barring parameter. The first barring parameter is used by a first-type terminal device to perform initial access to the first cell, and the second barring parameter is used by a second-type terminal device to perform initial access to the first cell.

The first-type terminal device and the second-type terminal device are terminal devices having different hardware capabilities, which may be specifically different bandwidths that are supported, different quantities of antennas, different maximum modulation orders that are supported, different maximum subcarrier spacings that are supported, different signal processing capabilities, and the like. An example in which the hardware capability of the first-type terminal device is greater than the capability of the second terminal device is used below for description, and vice versa. For example, the first-type terminal device includes a legacy NR terminal device, and the second-type terminal device includes an NR-light terminal device, where a bandwidth of the NR terminal device is greater than a bandwidth of the NR-light terminal device.

The first barring parameter and the second barring parameter each include a set of cell barring parameters. Cell barring is a manner of controlling lode by a network, and the network may control the terminal device not to camp on a cell in the case of heavy load. There are two cell barring parameters: cellBarred and intraFreqReselection. After reading a MIB of a cell, if the terminal device finds, based on cellBarred, that the cell is barred, the terminal device cannot camp on the current cell. If intraFreqReselection is set to NotAllowed (NotAllowed), it indicates that the terminal device cannot reselect to another cell on this frequency. If intraFreqReselection is set to Allowed (Allowed), it indicates that the terminal device can reselect to another cell on the frequency.

Optionally, the third indication information includes first reservation indication information, second reservation indication information, or third reservation indication information. The first reservation indication information indicates whether the first cell is a cell reserved by a network operator for another purpose. If the first reservation indication information is true, it indicates that the terminal device cannot camp on the first cell. The second reservation indication information indicates that the first cell is a cell reservation indication configured for the first-type terminal device. If the second reservation indication information is true, it indicates that the first-type terminal device cannot camp on the first cell. The third reservation indication information indicates that the first cell is a cell reservation indication configured for the second-type terminal device. If the third reservation indication information is true, it indicates that the second-type terminal device cannot camp on the first cell.

Optionally, the third indication information may be indicated by a cell-defined SSB that indicates a location of the first cell.

Optionally, the third indication information may be indicated by an SIB1 of the first cell.

Optionally, the third indication information may be indicated by another SIB of the first cell.

S620: The terminal device determines, based on a type of the terminal device and the third indication information, to use the first barring parameter or the second barring parameter.

The terminal device determines, based on whether the terminal device is the first-type terminal device or the second-type terminal device, to use the first barring parameter or the second barring parameter in the third indication information.

If the terminal device is the first-type terminal device, the terminal device uses the first barring parameter, to determine whether the terminal device can camp on the first cell or a cell that has a same frequency as the first cell.

If the terminal device is the second-type terminal device, the terminal device uses the second barring parameter, to determine whether the terminal device can camp on the first cell or a cell that has a same frequency as the first cell.

In the foregoing technical solution, another set of cell barring parameters is used, so that the first-type terminal device or the second-type terminal device can flexibly select a corresponding cell barring parameter based on the type of the first-type terminal device or the second-type terminal device, and further determine, based on the selected cell barring parameter, whether the first-type terminal device or the second-type terminal device can camp on a cell or another cell that has a same frequency as the cell.

Embodiments described in this specification may be independent solutions, or may be combined based on internal logic. These solutions all fall within the protection scope of this application.

It may be understood that the methods and operations implemented by the terminal device in the foregoing method embodiments may alternatively be implemented by a component (for example, a chip or a circuit) applicable to the terminal device, and the methods and operations implemented by the network device in the foregoing method embodiments may alternatively be implemented by a component (for example, a chip or a circuit) applicable to the network device.

The foregoing describes the method embodiments provided in this application, and the following describes apparatus embodiments provided in this application. It should be understood that descriptions of the apparatus embodiments correspond to the descriptions of the method embodiments. Therefore, for content that is not described in detail, refer to the foregoing method embodiments. For brevity, details are not described herein again.

The foregoing mainly describes the solutions provided in embodiments of this application from the perspective of interaction between network elements. It may be understood that, to implement the foregoing functions, each network element, such as a transmit end device or a receive end device, includes a corresponding hardware structure and/or software module for performing each function. A person skilled in the art may be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the protection scope of this application.

In embodiments of this application, the transmit end device or the receive end device may be divided into functional modules based on the foregoing method examples. For example, the transmit end device or the receive end device may be divided into functional modules based on corresponding functions, or two or more functions may be integrated into one processing module. The integrated module may be implemented in a form of hardware, or may be implemented in a form of a software functional module. It should be noted that, in embodiments of this application, division into the modules is an example, and is merely logical function division. In actual implementation, another feasible division manner may be available. An example in which each functional module is obtained through division based on each corresponding function is used below for description.

Figure 7:
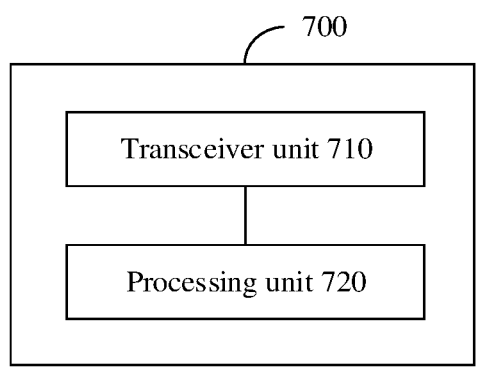
FIG. 7 is a schematic block diagram of a communication apparatus according to an embodiment of this application.

FIG. 7 is a schematic block diagram of a communication apparatus according to an embodiment of this application. The communication apparatus 700 includes a transceiver unit 710 and a processing unit 720. The transceiver unit 710 may communicate with the outside, and the processing unit 720 is configured to process data. The transceiver unit 710 may also be referred to as a communication interface or a communication unit.

Optionally, the communication apparatus 700 may further include a storage unit. The storage unit may be configured to store instructions and/or data. The processing unit 720 may read the instructions and/or the data in the storage unit.

The communication apparatus 700 may be configured to perform the actions performed by the terminal device in the foregoing method embodiments. In this case, the communication apparatus 700 may be the terminal device or a component that can be configured in the terminal device. The transceiver unit 710 is configured to perform receiving/sending-related operations on the terminal device side in the foregoing method embodiments. The processing unit 720 is configured to perform processing-related operations on the terminal device side in the foregoing method embodiments.

Alternatively, the communication apparatus 700 may be configured to perform the actions performed by the network device in the foregoing method embodiments. In this case, the communication apparatus 700 may be the network device or a component that can be configured in the network device. The transceiver unit 710 is configured to perform receiving/sending-related operations on the network device side in the foregoing method embodiments. The processing unit 720 is configured to perform processing-related operations on the network device side in the foregoing method embodiments.

In a design, when the communication apparatus 700 is a terminal device, the communication apparatus 700 is configured to perform the actions performed by the terminal device in the embodiment shown in FIG. 4. The transceiver unit 710 is configured to receive first indication information sent by a network device, where the first indication information indicates information about an initial bandwidth part of a first cell, the first cell is a neighboring cell of a second cell, and the second cell is a cell on which the terminal device currently camps. The processing unit 720 is configured to: detect that the first cell meets a reselection measurement criterion, and determine, based on a type of the terminal device and the first indication information, whether to measure the first cell.

Optionally, the processing unit 720 is configured to: when detecting that the first cell meets the reselection measurement criterion, if the type of the terminal device does not support the initial bandwidth part of the first cell, skip measuring the first cell; or if the type of the terminal device supports the initial bandwidth part of the first cell, measure the first cell.

Optionally, the processing unit 720 is configured to: when determining that the first cell is a target cell, if the type of the terminal device does not support the initial bandwidth part of the first cell, control the terminal device not to reselect to the first cell; or if the type of the terminal device supports the initial bandwidth part of the first cell, control the terminal device to reselect from the second cell to the first cell.

Optionally, the type of the terminal device is a first-type terminal device or a second-type terminal device, and a bandwidth capability of the first-type terminal device is different from a bandwidth capability of the second-type terminal device.

Optionally, the information about the initial bandwidth part of the first cell includes one or more of the following information: a bandwidth width of the initial bandwidth part of the first cell and a type of the initial bandwidth part of the first cell.

Optionally, the type of the initial bandwidth part of the first cell includes: an initial bandwidth part that supports camping of the first-type terminal device, an initial bandwidth part that supports camping of the second-type terminal device, and an initial bandwidth part that supports camping of both the first-type terminal device and the second-type terminal device.

In another design, when the communication apparatus 700 is a network device, the communication apparatus 700 is configured to perform the actions performed by the network device in the embodiment shown in FIG. 4. The transceiver unit 710 is configured to send first indication information to a terminal device, where the first indication information indicates information about an initial bandwidth part of a first cell, the first cell is a neighboring cell of a second cell, and the second cell is a cell on which the terminal device currently camps.

Optionally, the information about the initial bandwidth part of the first cell includes one or more of the following information: a bandwidth width of the initial bandwidth part of the first cell and a type of the initial bandwidth part of the first cell.

Optionally, the type of the initial bandwidth part of the first cell includes: an initial bandwidth part that supports camping of a first-type terminal device, an initial bandwidth part that supports camping of a second-type terminal device, and an initial bandwidth part that supports camping of both the first-type terminal device and the second-type terminal device, where a bandwidth capability of the first-type terminal device is different from a bandwidth capability of the second-type terminal device.

In still another design, when the communication apparatus 700 is a terminal device, the communication apparatus 700 is configured to perform the actions performed by the terminal device in the embodiment shown in FIG. 5. The transceiver unit 710 is configured to receive a first synchronization signal block from a network device, where the first synchronization signal block includes first indication information, the first indication information indicates a cell type of a first cell, the first cell is a cell defined by a second synchronization signal block, the first synchronization signal block includes second indication information, the second indication information indicates a location of the second synchronization signal block, the first synchronization signal block is a non-cell-defined synchronization signal block, and the second synchronization signal block is a cell-defined synchronization signal block. The processing unit 720 is configured to determine, based on a type of the terminal device and the cell type of the first cell, whether to search for the second synchronization signal block at the location of the second synchronization signal block.

Optionally, the type of the terminal device is a first-type terminal device or a second-type terminal device, and a bandwidth capability of the first-type terminal device is different from a bandwidth capability of the second-type terminal device.

Optionally, the cell type includes: a cell that supports camping of the first-type terminal device, a cell that supports camping of the second-type terminal device, and a cell that supports camping of both the first-type terminal device and the second-type terminal device.

Optionally, the processing unit 720 is configured to search for a synchronization signal block in frequency domain based on a preset step, where the synchronization signal block is the first synchronization signal block.

In still another design, when the communication apparatus 700 is a network device, the communication apparatus 700 is configured to perform the actions performed by the network device in the embodiment shown in FIG. 5. The transceiver unit 710 is configured to send a first synchronization signal block to a terminal device, where the first synchronization signal block includes first indication information, the first indication information indicates a cell type of a first cell, the first cell is a cell defined by a second synchronization signal block, the first synchronization signal block includes second indication information, the second indication information indicates a location of the second synchronization signal block, the first synchronization signal block is a non-cell-defined synchronization signal block, and the second synchronization signal block is a cell-defined synchronization signal block.

Optionally, the cell type includes: a cell that supports camping of a first-type terminal device, a cell that supports camping of a second-type terminal device, and a cell that supports camping of both the first-type terminal device and the second-type terminal device, where a bandwidth capability of the first-type terminal device is different from a bandwidth capability of the second-type terminal device.

In still another design, when the communication apparatus 700 is a terminal device, the communication apparatus 700 is configured to perform the actions performed by the terminal device in the embodiment shown in FIG. 6. The transceiver unit 710 is configured to receive third indication information sent by a network device, where the third indication information includes a first barring parameter and a second barring parameter, the first barring parameter is used by a first-type terminal device to perform initial access to a first cell, the second barring parameter is used by a second-type terminal device to perform initial access to the first cell, and a bandwidth capability of the first-type terminal device is different from a bandwidth capability of the second-type terminal device. The processing unit 720 is configured to determine, based on a type of the terminal device, to use the first barring parameter or the second barring parameter.

In still another design, when the communication apparatus 700 is a network device, the communication apparatus 700 is configured to perform the actions performed by the network device in the embodiment shown in FIG. 6. The transceiver unit 710 is configured to send third indication information to a terminal device, where the third indication information includes a first barring parameter and a second barring parameter, the first barring parameter is used by a first-type terminal device to perform initial access to a first cell, the second barring parameter is used by a second-type terminal device to perform initial access to the first cell, and a bandwidth capability of the first-type terminal device is different from a bandwidth capability of the second-type terminal device.

The processing unit 720 in FIG. 7 may be implemented by a processor or a processor-related circuit. The transceiver unit 710 may be implemented by a transceiver or a transceiver-related circuit. The transceiver unit 710 may also be referred to as a communication unit or a communication interface. The storage unit may be implemented by a memory.

Figure 8:
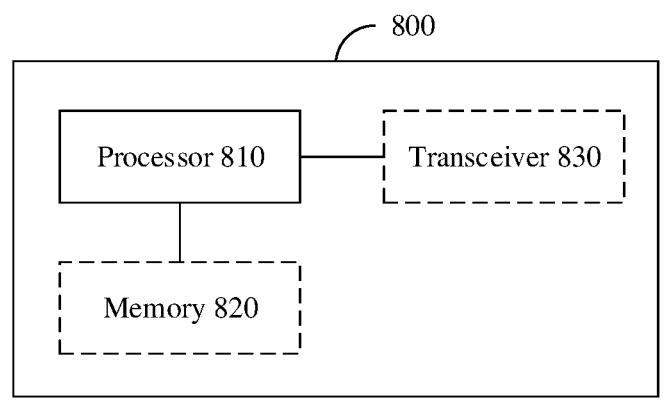
FIG. 8 is a schematic block diagram of another communication apparatus according to an embodiment of this application.

As shown in FIG. 8, an embodiment of this application further provides a communication apparatus 800. The communication apparatus 800 includes a processor 810. The processor 810 is coupled to a memory 820. The memory 820 is configured to store a computer program or instructions and/or data. The processor 810 is configured to execute the computer program or the instructions and/or the data stored in the memory 820, so that the methods in the foregoing method embodiments are executed.

Optionally, the communication apparatus 800 includes one or more processors 810.

Optionally, as shown in FIG. 8, the communication apparatus 800 may further include the memory 820.

Optionally, the communication apparatus 800 may include one or more memories 820.

Optionally, the memory 820 may be integrated with the processor 810, or separately disposed.

Optionally, as shown in FIG. 8, the communication apparatus 800 may further include a transceiver 830, and the transceiver 830 is configured to receive and/or send a signal. For example, the processor 810 is configured to control the transceiver 830 to receive and/or send a signal.

In a solution, the communication apparatus 800 is configured to perform the operations performed by the terminal device in the foregoing method embodiments.

For example, the processor 810 is configured to perform a processing-related operation performed by the terminal device in the foregoing method embodiments, and the transceiver 830 is configured to perform a receiving/sending-related operation performed by the terminal device in the foregoing method embodiments.

In another solution, the communication apparatus 800 is configured to perform the operations performed by the network device in the foregoing method embodiments.

For example, the processor 810 is configured to perform a processing-related operation performed by the network device in the foregoing method embodiments, and the transceiver 830 is configured to perform a receiving/sending-related operation performed by the network device in the foregoing method embodiments.

Figure 9:
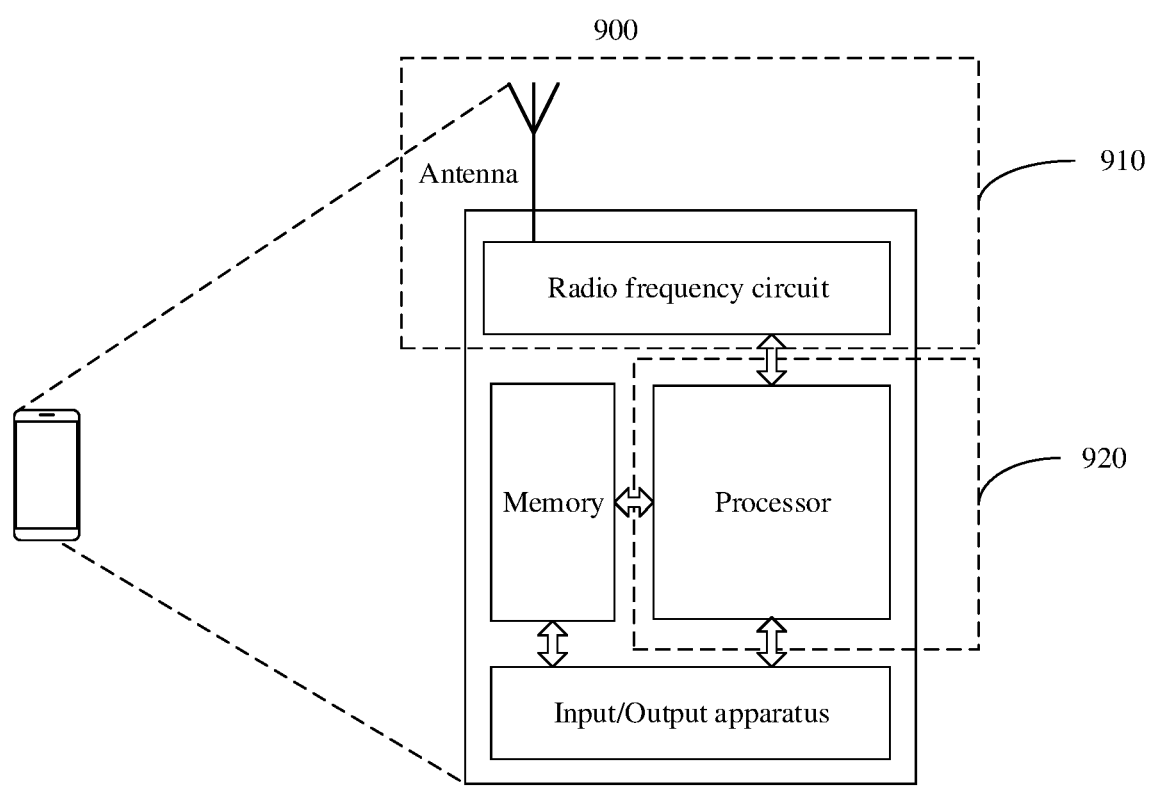
FIG. 9 is a schematic block diagram of a terminal device according to an embodiment of this application.

An embodiment of this application further provides a communication apparatus 900. The communication apparatus 900 may be a terminal device or a chip. The communication apparatus 900 may be configured to perform an operation performed by the terminal device in the foregoing method embodiments. When the communication apparatus 900 is a terminal device, FIG. 9 is a simplified schematic diagram of a structure of the terminal device. For ease of understanding and convenience of illustration, an example in which the terminal device is a mobile phone is used in FIG. 9. As shown in FIG. 9, the terminal device includes a processor, a memory, a radio frequency circuit, an antenna, and an input/output apparatus. The processor is mainly configured to: process a communication protocol and communication data, control the terminal device, execute a software program, process data of the software program, and so on. The memory is mainly configured to store the software program and the data. The radio frequency circuit is mainly configured to: perform conversion between a baseband signal and a radio frequency signal, and process the radio frequency signal. The antenna is mainly configured to send and receive a radio frequency signal in a form of an electromagnetic wave. The input/output apparatus, such as a touchscreen, a display, or a keyboard, is mainly configured to receive data input by a user, and output data to a user. It should be noted that some types of terminal devices may have no input/output apparatus.

When data needs to be sent, the processor performs baseband processing on the to-be-sent data, and outputs a baseband signal to the radio frequency circuit. The radio frequency circuit performs radio frequency processing on the baseband signal and then sends a radio frequency signal to the outside in a form of an electromagnetic wave through the antenna. When data is sent to the terminal device, the radio frequency circuit receives the radio frequency signal through the antenna, converts the radio frequency signal into a baseband signal, and outputs the baseband signal to the processor, and the processor converts the baseband signal into data and processes the data. For ease of description, FIG. 9 shows only one memory and one processor. In an actual terminal device product, there may be one or more processors and one or more memories. The memory may also be referred to as a storage medium, a storage device, or the like. The memory may be independent of the processor, or may be integrated with the processor. This is not limited in embodiments of this application.

In this embodiment of this application, the antenna and the radio frequency circuit that have receiving and sending functions may be considered as a transceiver unit of the terminal device, and the processor that has a processing function may be considered as a processing unit of the terminal device.

As shown in FIG. 9, the terminal device includes a transceiver unit 910 and a processing unit 920. The transceiver unit 910 may also be referred to as a transceiver, a transceiver apparatus, or the like. The processing unit 920 may also be referred to as a processor, a processing board, a processing module, a processing apparatus, or the like.

Optionally, a component that is in the transceiver unit 910 and that is configured to implement a receiving function may be considered as a receiving unit, and a component that is in the transceiver unit 910 and that is configured to implement a sending function may be considered as a sending unit. In other words, the transceiver unit 910 includes the receiving unit and the sending unit. The transceiver unit sometimes may also be referred to as a transceiver, a transceiver circuit, or the like. The receiving unit sometimes may also be referred to as a receiver, a receiver circuit, or the like. The sending unit sometimes may also be referred to as a transmitter, a transmitting circuit, or the like.

For example, in an implementation, the transceiver unit 910 is configured to perform receiving operations of the terminal device in FIG. 4 to FIG. 6. The processing unit 920 is configured to perform processing actions on a terminal device side in FIG. 4 to FIG. 6.

It should be understood that FIG. 9 is merely an example instead of a limitation. The terminal device including the transceiver unit and the processing unit may not depend on the structure shown in FIG. 9.

When the communication apparatus 900 is a chip, the chip includes a transceiver unit and a processing unit. The transceiver unit may be an input/output circuit or a communication interface. The processing unit may be a processor, a microprocessor, or an integrated circuit that is integrated on the chip.

An embodiment of this application further provides a communication apparatus 1000. The communication apparatus 1000 may be a network device or a chip. The communication apparatus 1000 may be configured to perform an operation performed by the network device in the foregoing method embodiments.

Figure 10:
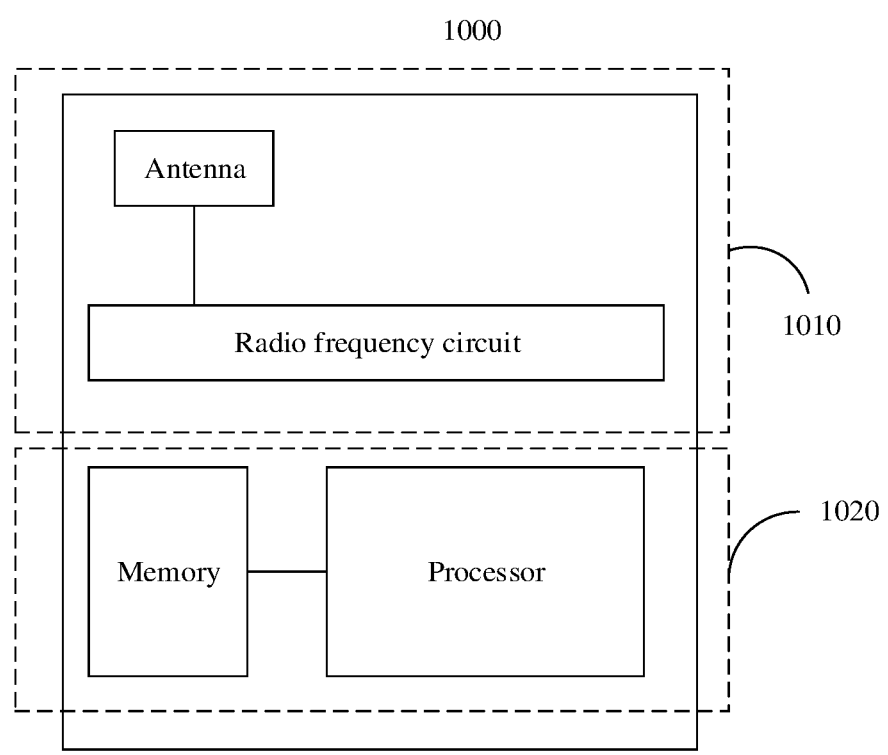
FIG. 10 is a schematic block diagram of a network device according to an embodiment of this application.

When the communication apparatus 1000 is a network device, for example, a base station, FIG. 10 is a simplified schematic diagram of a structure of the base station. The base station includes a part 1010 and a part 1020. The part 1010 is mainly configured to send and receive a radio frequency signal, and perform conversion between the radio frequency signal and a baseband signal. The part 1020 is mainly configured to perform baseband processing, control the base station, and so on. The part 1010 may usually be referred to as a transceiver unit, a transceiver circuit, a transceiver, or the like. The part 1020 is usually a control center of the base station, and may usually be referred to as a processing unit, configured to control the base station to perform processing operations on a network device side in the foregoing method embodiments.

The transceiver unit in the part 1010 may also be referred to as a transceiver or the like. The transceiver unit includes an antenna and a radio frequency circuit, where the radio frequency circuit is mainly configured to perform radio frequency processing. Optionally, a component that is in the part 1010 and that is configured to implement a receiving function may be considered as a receiving unit, and a component that is in the part 1010 and that is configured to implement a sending function may be considered as a sending unit. In other words, the part 1010 includes the receiving unit and the sending unit. The receiving unit may also be referred to as a receiver, a receiver circuit, or the like. The sending unit may be referred to as a transmitter, a transmit circuit, or the like.

The part 1020 may include one or more boards, and each board may include one or more processors and one or more memories. The processor is configured to read and execute a program in the memory to implement a baseband processing function and control the base station. If there are a plurality of boards, the boards may be interconnected to enhance a processing capability. In an optional implementation, the plurality of boards may share one or more processors, or the plurality of boards may share one or more memories, or the plurality of boards may share one or more processors at the same time.

For example, in an implementation, the transceiver unit in the part 1010 is configured to perform receiving/sending-related steps performed by the network device in the embodiments shown in FIG. 4 to FIG. 6, and the part 1020 is configured to perform processing-related steps performed by the network device in the embodiments shown in FIG. 4 to FIG. 6.

It should be understood that FIG. 10 is merely an example instead of a limitation. The network device including the transceiver unit and the processing unit may not depend on the structure shown in FIG. 10.

When the communication apparatus 1000 is a chip, the chip includes a transceiver unit and a processing unit. The transceiver unit may be an input/output circuit or a communication interface. The processing unit is a processor, a microprocessor, or an integrated circuit that is integrated on the chip.

An embodiment of this application further provides a computer-readable storage medium. The computer-readable storage medium stores computer instructions used to implement the method performed by the terminal device or the method performed by the network device in the foregoing method embodiments.

For example, when the computer program is executed by a computer, the computer is enabled to implement the method performed by the terminal device or the method performed by the network device in the foregoing method embodiments.

An embodiment of this application further provides a computer program product including instructions. When the instructions are executed by a computer, the computer is enabled to implement the method performed by the terminal device or the method performed by the network device in the foregoing method embodiments.

An embodiment of this application further provides a communication system. The communication system includes the network device and the terminal device in the foregoing embodiments.

In an example, the communication system includes the network device and the terminal device in the embodiments described above with reference to FIG. 4 to FIG. 6.

For explanations and beneficial effects of related content of any communication apparatus provided above, refer to the corresponding method embodiment provided above. Details are not described herein again.

In embodiments of this application, the terminal device or the network device may include a hardware layer, an operating system layer running above the hardware layer, and an application layer running above the operating system layer. The hardware layer may include hardware such as a central processing unit (CPU), a memory management unit (MMU), and a memory (which is also referred to as a main memory).

An operating system of the operating system layer may be any one or more of computer operating systems implementing service processing by using a process, for example, a Linux operating system, a Unix operating system, an Android operating system, an iOS operating system, or a Windows operating system. The application layer may include applications such as a browser, an address book, word processing software, and instant messaging software.

A specific structure of an execution body of the method provided in embodiments of this application is not specifically limited in embodiments of this application, provided that a program that records code of the method provided in embodiments of this application can be run to perform communication according to the method provided in embodiments of this application. For example, the method provided in embodiments of this application may be performed by a terminal device or a network device, or may be performed by a functional module that is in the terminal device or the network device and that can invoke and execute a program.

Aspects or features of this application may be implemented as a method, an apparatus, or a product that uses standard programming and/or engineering technologies. As used herein, the term "product" may cover a computer program that is accessible from any computer-readable device, carrier, or medium. For example, a computer-readable medium may include but is not limited to: a magnetic storage device (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive).

Various storage media described in this specification may indicate one or more devices and/or other machine-readable media that are configured to store information. The term "machine-readable media" may include but is not limited to a radio channel and various other media that can store, include, and/or carry instructions and/or data.

It should be understood that, the processor mentioned in embodiments of this application may be a central processing unit (CPU), or the processor may be another general-purpose processor, a digital signal processor (DSP), an application-specific integrated circuit (ASIC), a field programmable gate array (FPGA), another programmable logic device, a discrete gate or transistor logic device, a discrete hardware component, or the like. The general-purpose processor may be a microprocessor, or the processor may be any conventional processor or the like.

It should be further understood that the memory in embodiments of this application may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (electrically EPROM, EEPROM), or a flash memory. The volatile memory may be a random access memory (RAM). For example, the RAM may be used as an external cache. By way of example but not limitation, the RAM may include a plurality of forms in the following: a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that when the processor is a general-purpose processor, a DSP, an ASIC, an FPGA, another programmable logic device, a discrete gate or a transistor logic device, or a discrete hardware component, the memory (storage module) may be integrated into the processor.

It should also be noted that the memories described in this specification are intended to include, but are not limited to, these and any other suitable types of memories.

A person of ordinary skill in the art may be aware that, with reference to the examples described in embodiments disclosed in this specification, units and steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the protection scope of this application.

It may be clearly understood by a person skilled in the art that, for the purpose of convenient and brief description, for detailed working processes of the foregoing described apparatuses and units, refer to corresponding processes in the foregoing method embodiments. Details are not described herein again.

In the several embodiments provided in this application, it should be understood that the disclosed apparatuses and methods may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

The units described as separate parts may or may not be physically separate, and parts displayed as units may or may not be physical units, may be located in one position, or may be distributed on a plurality of network units. Some or all of the units may be selected based on an actual requirement to implement the objectives of the solutions of embodiments.

In addition, function units in embodiments of this application may be integrated into one unit, or each of the units may exist alone physically, or two or more units are integrated into one unit.

All or some of the foregoing embodiments may be implemented by using software, hardware, firmware, or any combination thereof. When software is used to implement embodiments, all or some of embodiments may be implemented in a form of a computer program product. The computer program product includes one or more computer instructions. When the computer program instructions are loaded and executed on a computer, all or some of procedures or functions according to embodiments of the present invention are generated. The computer may be a general-purpose computer, a dedicated computer, a computer network, or another programmable apparatus. For example, the computer may be a personal computer, a server, a network device, or the like. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like. For example, the usable medium may include but is not limited to any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
receiving a first cell barred parameter and a second cell barred parameter, the first cell barred parameter is usable by a first-type terminal device to determine whether to camp on a first cell, and the second cell barred parameter is usable by a second-type terminal device to determine whether to camp on the first cell, and
determining, based on a type of a terminal device, to use the first cell barred parameter or the second cell barred parameter, wherein the type of the terminal device is the first-type terminal device or the second-type terminal, device, and wherein a quantity of one or more antennas of the first-type terminal device is different from a quantity of one or more antennas of the second-type terminal device.

2. The method according to claim 1, wherein the first-type terminal device and the second-type terminal device satisfy one or more of the following:
a bandwidth capability of the first-type terminal device is different from a bandwidth capability of the second-type terminal device;
the first-type terminal device and the second-type terminal device are terminal devices having different hardware capabilities;
a bandwidth that is supported by the first-type terminal device is different from a bandwidth that is supported by the second-type terminal device;
a maximum modulation order that is supported by the first-type terminal device is different from a maximum modulation order that is supported by the second-type terminal device;
a maximum subcarrier spacing that is supported by the first-type terminal device is different from a maximum subcarrier spacing that is supported by the second-type terminal device; or a signal processing capability of the first-type terminal device is different from a signal processing capability of the second-type terminal device.

3. The method according to claim 1, wherein the first cell is a current cell of the terminal device.

4. The method according to claim 1, wherein the terminal device is the first-type terminal device and the terminal device uses the first cell barred parameter to determine whether the terminal device is able to camp on the first cell, or the terminal device is the second-type terminal device and the terminal device uses the second cell barred parameter to determine whether the terminal device is able to camp on the first cell.

5. The method according to claim 1, further comprises:
receiving an intraFreqReselection parameter, wherein the intraFreqReselection parameter indicates whether the terminal device is allowed to reselect to another cell that has a same frequency as the first cell when the first cell is barred.

6. A method, comprising:
sending a first cell barred parameter and a second cell barred parameter, wherein the first cell barred parameter is usable by a first-type terminal device to determine whether to camp on a first cell, and the second cell barred parameter is usable by a second-type terminal device to determine whether to camp on the first cell, and wherein a quantity of one or more antennas of the first-type terminal device is different from a quantity of one or more antennas of the second-type terminal device.

7. The method according to claim 6, wherein the first-type terminal device and the second-type terminal device satisfy one or more of the following:
a bandwidth capability of the first-type terminal device is different from a bandwidth capability of the second-type terminal device;
the first-type terminal device and the second-type terminal device are terminal devices having different hardware capabilities;
a bandwidth that is supported by the first-type terminal device is different from a bandwidth that is supported by the second-type terminal device;
a maximum modulation order that is supported by the first-type terminal device is different from a maximum modulation order that is supported by the second-type terminal device;
a maximum subcarrier spacing that is supported by the first-type terminal device is different from a maximum subcarrier spacing that is supported by the second-type terminal device; or
a signal processing capability of the first-type terminal device is different from a signal processing capability of the second-type terminal device.

8. The method according to claim 6, wherein the first cell is a current cell of the terminal device.

9. The method according to claim 8, wherein the terminal device is the first-type terminal device and the terminal device uses the first cell barred parameter to determine whether the terminal device is able to camp on the first cell, or the terminal device is the second-type terminal device and the terminal device uses the second cell barred parameter to determine whether the terminal device is able to camp on the first cell.

10. The method according to claim 8, wherein the method further comprises:
receiving an intraFreqReselection parameter, wherein the intraFreqReselection parameter indicates whether the terminal device is allowed to reselect to another cell that has a same frequency as the first cell when the first cell is barred.

11. A communication apparatus, comprising:
one or more processors; and
a memory, wherein the memory stores a computer program, and when the computer program stored in the memory is executed, the one or more processors execute operations comprising:
receiving a first cell barred parameter and a second cell barred parameter, wherein the first cell barred parameter is usable by a first-type terminal device to determine whether to camp on a first cell, and the second cell barred parameter is usable by a second-type terminal device to determine whether to camp on the first cell; and
determining, based on a type of a terminal device, to use the first cell barred parameter or the second cell barred parameter, wherein the type of the terminal device is the first-type terminal device or the second-type terminal device, and wherein a quantity of one or more antennas of the first-type terminal device is different from a quantity of one or more antennas of the second-type terminal device.

12. The communication apparatus according to claim 11, wherein the first-type terminal device and the second-type terminal device satisfy one or more of the following:
a bandwidth capability of the first-type terminal device is different from a bandwidth capability of the second-type terminal device;
the first-type terminal device and the second-type terminal device are terminal devices having different hardware capabilities;
a bandwidth that is supported by the first-type terminal device is different from a bandwidth that is supported by the second-type terminal device;
a maximum modulation order that is supported by the first-type terminal device is different from a maximum modulation order that is supported by the second-type terminal device;
a maximum subcarrier spacing that is supported by the first-type terminal device is different from a maximum subcarrier spacing that is supported by the second-type terminal device; or
a signal processing capability of the first-type terminal device is different from a signal processing capability of the second-type terminal device.

13. The communication apparatus according to claim 11, wherein the first cell is a current cell of the terminal device.

14. The communication apparatus according to claim 11, wherein the terminal device is the first-type terminal device and the terminal device uses the first cell barred parameter to determine whether the terminal device is able to camp on the first cell, or the terminal device is the second-type terminal device and the terminal device uses the second cell barred parameter to determine whether the terminal device is able to camp on the first cell.

15. The communication apparatus according to claim 11, wherein the operations further comprise:
receiving an intraFreqReselection parameter, wherein the intraFreqReselection parameter indicates whether the terminal device is allowed to reselect to another cell that has a same frequency as the first cell when the first cell is barred.

16. A communication apparatus, comprising:
one or more processors; and a memory, wherein the memory stores a computer program, and when executing the computer program stored in the memory, the one or more processors execute operations comprising:

sending a first cell barred parameter and a second cell barred parameter, wherein the first cell barred parameter is usable by a first-type terminal device to determine whether to camp on a first cell, and the second cell barred parameter is usable by a second-type terminal device to determine whether to camp on the first cell, and wherein a quantity of one or more antennas of the first-type terminal device is different from a quantity of one or more antennas of the second-type terminal device.

17. The communication apparatus according to claim 16, wherein the first-type terminal device and the second-type terminal device satisfy one or more of the following:

a bandwidth capability of the first-type terminal device is different from a bandwidth capability of the second-type terminal device;

the first-type terminal device and the second-type terminal device are terminal devices having different hardware capabilities;

a bandwidth that is supported by the first-type terminal device is different from a bandwidth that is supported by the second-type terminal device;

a maximum modulation order that is supported by the first-type terminal device is different from a maximum modulation order that is supported by the second-type terminal device;

a maximum subcarrier spacing that is supported by the first-type terminal device is different from a maximum subcarrier spacing that is supported by the second-type terminal device; or a signal processing capability of the first-type terminal device is different from a signal processing capability of the second-type terminal device.

18. The communication apparatus according to claim 16, wherein the first cell is a current cell of the terminal device.

19. The communication apparatus according to claim 18, wherein the terminal device is the first-type terminal device and the terminal device uses the first cell barred parameter to determine whether the terminal device is able to camp on the first cell, or the terminal device is the second-type terminal device and the terminal device uses the second cell barred parameter to determine whether the terminal device is able to camp on the first cell.

20. The communication apparatus according to claim 18, wherein the operations further comprise:

receiving an intraFreqReselection parameter, wherein the intraFreqReselection parameter indicates whether the terminal device is allowed to reselect to another cell that has a same frequency as the first cell when the first cell is barred.

* * * * *

UNITED STATES PATENT AND TRADEMARK OFFICE
CERTIFICATE OF CORRECTION

PATENT NO. : 12,323,900 B2  
APPLICATION NO. : 17/848781  
DATED : June 3, 2025  
INVENTOR(S) : Chen et al.

Page 1 of 1

It is certified that error appears in the above-identified patent and that said Letters Patent is hereby corrected as shown below:

In the Claims

In Column 34, in Claim 1, Lines 43-44, "terminal, device," and insert -- terminal device, --.

Signed and Sealed this  
Fifteenth Day of July, 2025

Coke Morgan Stewart  
*Acting Director of the United States Patent and Trademark Office*